United States Patent
Kurokawa

(10) Patent No.: US 10,991,340 B2
(45) Date of Patent: Apr. 27, 2021

(54) IMAGE PROCESSING APPARATUS AND IMAGE PROCESSING METHOD

(71) Applicant: SONY CORPORATION, Tokyo (JP)

(72) Inventor: Masuyoshi Kurokawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/321,958

(22) PCT Filed: Aug. 10, 2017

(86) PCT No.: PCT/JP2017/029192
§ 371 (c)(1),
(2) Date: Jan. 30, 2019

(87) PCT Pub. No.: WO2018/037948
PCT Pub. Date: Mar. 1, 2018

(65) Prior Publication Data
US 2019/0172423 A1   Jun. 6, 2019

(30) Foreign Application Priority Data

Aug. 24, 2016 (JP) .............................. JP2016-163833

(51) Int. Cl.
*G09G 5/36* (2006.01)
*G09G 5/00* (2006.01)
*H04N 9/31* (2006.01)

(52) U.S. Cl.
CPC .................. *G09G 5/36* (2013.01); *G09G 5/00* (2013.01); *H04N 9/3185* (2013.01);
(Continued)

(58) Field of Classification Search
CPC .............................. G06F 3/0321; G09G 5/36; G09G 2340/0407; G09G 5/00; H04N 9/3185; H04N 9/3188; H04N 9/3194
See application file for complete search history.

(56) References Cited

U.S. PATENT DOCUMENTS 8,731,279 B2 * 5/2014 Shin ..................... H04N 13/194
382/154
8,854,433 B1 * 10/2014 Rafii ....................... G06F 3/017
348/47
(Continued)

FOREIGN PATENT DOCUMENTS

JP    2001-051346 A    2/2001
JP    2006-311029 A    11/2006
(Continued)

OTHER PUBLICATIONS

Jul. 18, 2019, European Search Report issued for related EP Application No. 17843431.2.
(Continued)

*Primary Examiner* — Ming Wu
(74) *Attorney, Agent, or Firm* — Paratus Law Group, PLLC

(57) ABSTRACT

The present disclosure relates to an image processing apparatus and an image processing method capable of realizing grasping of a state of a projected image at a lower cost. A difference between discontinuous frames of a captured image configured with a plurality of frames obtained by capturing a projected image which is obtained by sequentially projecting predetermined pattern images opposite in sign, which are positive and negative pattern images, at a higher frame rate than a frame rate of the projected image by a rolling shutter scheme is calculated. The present disclosure can be applied to, for example, an image processing apparatus, a projection apparatus, an imaging apparatus, a projection imaging apparatus, a controller, a projection imaging system, or the like.

19 Claims, 18 Drawing Sheets

(52) U.S. Cl.
CPC ......... *H04N 9/3188* (2013.01); *H04N 9/3194* (2013.01); *G09G 2340/0407* (2013.01)

(56) References Cited

U.S. PATENT DOCUMENTS

| | | | |
|---|---|---|---|
| 9,294,746 B1* | 3/2016 | Cederlof | H04N 9/3102 |
| 2004/0195310 A1* | 10/2004 | Silverbrook | H04N 3/1568 |
| | | | 235/375 |
| 2009/0303362 A1 | 12/2009 | Ebihara | |
| 2011/0079761 A1* | 4/2011 | Young | E04H 17/161 |
| | | | 256/24 |
| 2011/0227827 A1 | 9/2011 | Solomon et al. | |
| 2014/0354803 A1* | 12/2014 | Chida | G01B 11/25 |
| | | | 348/136 |
| 2015/0062013 A1 | 3/2015 | Solomon et al. | |
| 2015/0124228 A1* | 5/2015 | Hsu | H04N 9/3135 |
| | | | 353/98 |
| 2016/0180510 A1* | 6/2016 | Grau | G06T 7/80 |
| | | | 348/47 |

FOREIGN PATENT DOCUMENTS

| | | |
|---|---|---|
| JP | 2011-064859 A | 3/2011 |
| JP | 2016-051157 A | 4/2016 |
| JP | 2017-092819 A | 5/2017 |

OTHER PUBLICATIONS

Raskar et al., The Office of the Future: A Unified Approach to Image-Based Modeling and Spatially Immersive Displays, SIGGRAPH 98, Computer Graphics Proceedings, Annual Conference Series, 1998, Jul. 19-24, 1998, pp. 1-10, Orlando, Florida.

* cited by examiner

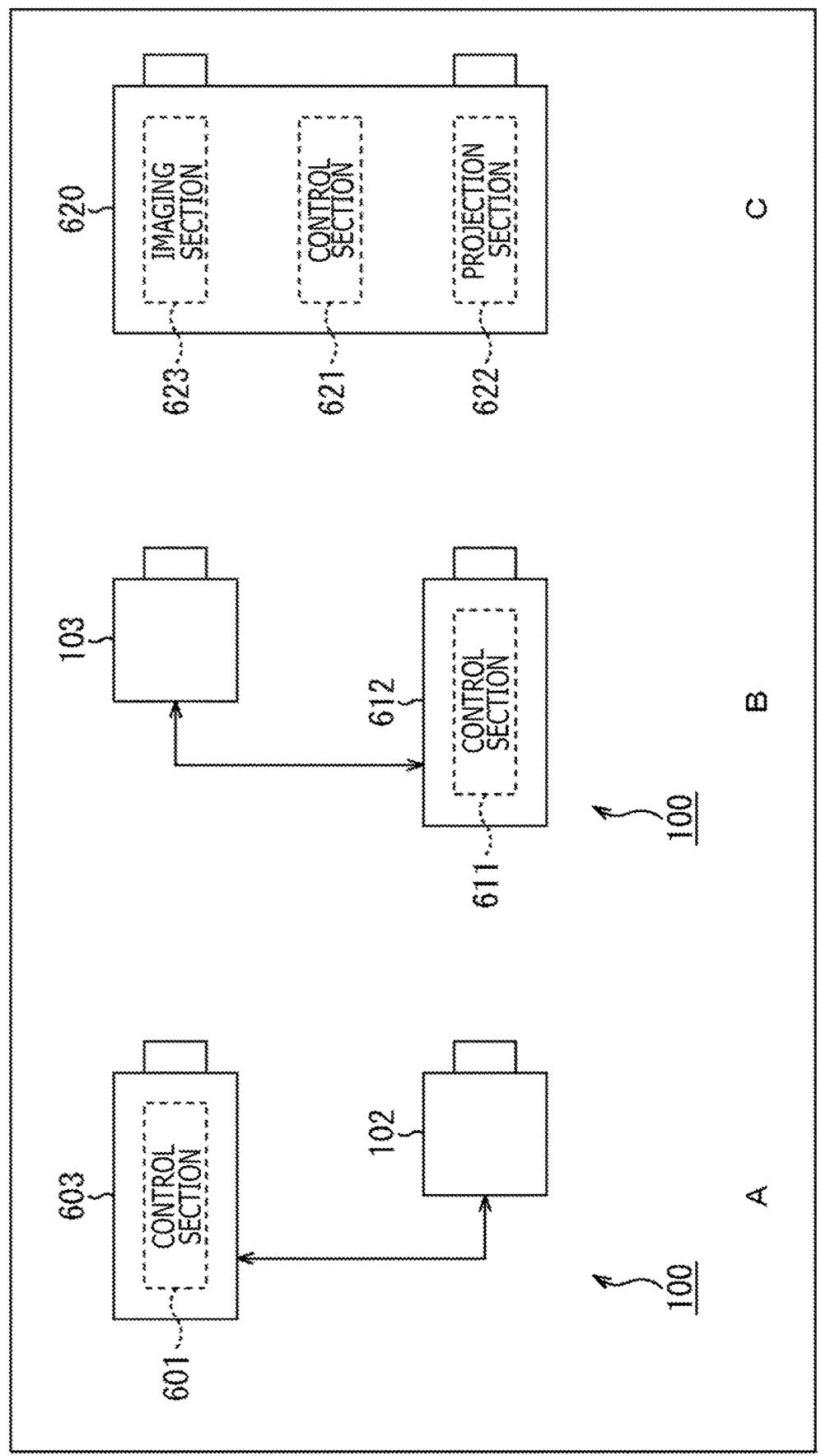

IMAGE PROCESSING APPARATUS AND IMAGE PROCESSING METHOD

CROSS REFERENCE TO PRIOR APPLICATION

This application is a National Stage Patent Application of PCT International Patent Application No. PCT/JP2017/029192 (filed on Aug. 10, 2017) under 35 U.S.C. § 371, which claims priority to Japanese Patent Application No. 2016-163833 (filed on Aug. 24, 2016), which are all hereby incorporated by reference in their entirety.

TECHNICAL FIELD

The present disclosure relates to an image processing apparatus and an image processing method and particularly, relates to an image processing apparatus and an image processing method capable of realizing grasping of a state of a projected image at a lower cost.

BACKGROUND ART

A method of capturing a projected image projected by a projector using a camera, estimating a position and a posture of the projector, a projection plane shape, and the like using the captured image, and geometrically correcting the projected image in accordance with the estimations for reduction of a distortion in the projected image, and the like has been known. For example, in a case in which a screen does not face the projector, the projected image projected onto the screen is captured by the camera. In addition, in a case in which the projected image is deformed into a trapezoid shape or the like, a process such as one for correcting the image to be projected into an inverted trapezoid shape is performed such that the image can be correctly projected onto the screen.

In a case of such a method, it is necessary to obtain correspondence points between the projected image and the captured image. In addition, as a method of obtaining the correspondence points, ISL (Imperceptible Structured Light) for performing sensing during viewing/listening of content has been proposed (refer to, for example, NPL 1). According to an ISL scheme, pattern images that are images of predetermined patterns are embedded into an image of the content and projected while being imperceptible to a person using an integration effect. In addition, correspondence points are detected using the pattern images.

CITATION LIST

Non Patent Literature

[NPL 1]
Imperceptible Structured Light Ramesh Raskar, SIGGRAPH 98

SUMMARY

Technical Problems

However, in a case of executing this method using an inexpensive rolling shutter camera, projected images of a plurality of frames are reflected in a captured image of one frame, which makes it difficult to extract the pattern images from the captured image. Owing to this, it is necessary to use an expensive global shutter camera to grasp a state of the projected images, which possibly results in a cost increase.

The present disclosure has been achieved in the light of such circumstances, and an object of the present disclosure is to make it possible to realize grasping of a state of a projected image at a lower cost.

Solution to Problems

An image processing apparatus according to one aspect of the present technique is an image processing apparatus including a difference calculation section calculating a difference between discontinuous frames of a captured image configured with a plurality of frames obtained by capturing a projected image which is obtained by sequentially projecting predetermined pattern images opposite in sign, which are positive and negative pattern images, by a projection section at a higher frame rate than a frame rate of the projected image by an imaging section driven by a rolling shutter scheme.

The difference calculation section can calculate a difference between the frames at an interval in accordance with a ratio of the frame rate of the projected image to the frame rate of the captured image.

The frame rate of the captured image is twice as high as the frame rate of the projected image, and it can be configured such that the difference calculation section calculates a difference between the frames at an interval of 2N frames.

The image processing apparatus further includes: an extraction section extracting a region where the pattern images are detectable from the difference between the frames calculated by the difference calculation section; and a joint section joining the region extracted from each of a plurality of differences by the extraction section together to generate the pattern image corresponding to one frame.

The image processing apparatus further includes a correspondence point detection section detecting correspondence points between the projection section and the imaging section using the pattern image generated by the joint section.

The image processing apparatus further includes an image correction section correcting an image projected by the projection section using the correspondence points detected by the correspondence point detection section.

The pattern images each include patterns available for detecting correspondence points between the projection section and the imaging section and patterns available for identifying a pixel row of the projected image, and the extraction section can be configured to extract the regions where the pattern images are detectable on the basis of the patterns available for identifying the pixel row of the projected image.

The pattern images each further include patterns available for identifying a pixel column of the projected image.

The patterns available for identifying the pixel row of the projected image and the patterns available for identifying the pixel column of the projected image in each of the pattern images can be formed near left, right, upper, and lower ends of the projected image.

The patterns available for identifying the pixel row of the projected image and the patterns available for identifying the pixel column of the projected image in the pattern image can be formed in a grid form on entirety of the projected image.

The pattern images each include patterns available for both detecting correspondence points between the projection section and the imaging section and patterns available for identifying a pixel row of the projected image, and the extraction section can be configured to extract the regions where the pattern images are detectable on the basis of the patterns available for both detecting the correspondence points between the projection section and the imaging section and identifying the pixel row of the projected image.

The image processing apparatus further includes a synchronous processing section synchronizing timing of projection by the projection section with timing of imaging by the imaging section.

The frame rate of the captured image is 2N (where N is a natural number) times as high as the frame rate of the projected image, and the difference calculation section can be configured to calculate a difference between the frames at an interval of 2N frames.

The image processing apparatus further includes an image selection section selecting frames for which the difference calculation section calculates the difference from the captured image of the plurality of frames.

The image selection section can select frames in each of which a plurality of frames of the projected image are mixed, in the captured image.

The image selection section can select frames in each of which only a single frame of the projected image is included, in the captured image.

The projected image can be obtained by sequentially projecting a superimposed image on which the pattern image that is positive is superimposed, and a superimposed image on which the pattern image that is negative is superimposed, onto predetermined frames of a moving image.

The image processing apparatus further includes the imaging section.

The image processing apparatus further includes the projection section.

An image processing method according to one aspect of the present technique is an image processing method including calculating a difference between discontinuous frames of a captured image configured with a plurality of frames obtained by capturing a projected image which is obtained by sequentially projecting predetermined pattern images opposite in sign, which are positive and negative pattern images, at a higher frame rate than a frame rate of the projected image by a rolling shutter scheme.

In the image processing apparatus and the image processing method according to the one aspect of the present technique, a difference between discontinuous frames of a captured image configured with a plurality of frames obtained by capturing a projected image which is obtained by sequentially projecting predetermined pattern images opposite in sign, which are positive and negative pattern images, at a higher frame rate than a frame rate of the projected image by a rolling shutter scheme is calculated.

Advantageous Effects of Invention

According to the present disclosure, it is possible to process an image. It is particularly possible to realize grasping of a state of a projected image at a lower cost.

BRIEF DESCRIPTION OF DRAWINGS

FIG. 18 is a block diagram illustrating an example of a configuration of principal parts of a projection imaging system and a projection imaging apparatus.

DESCRIPTION OF EMBODIMENTS

Figure 1:
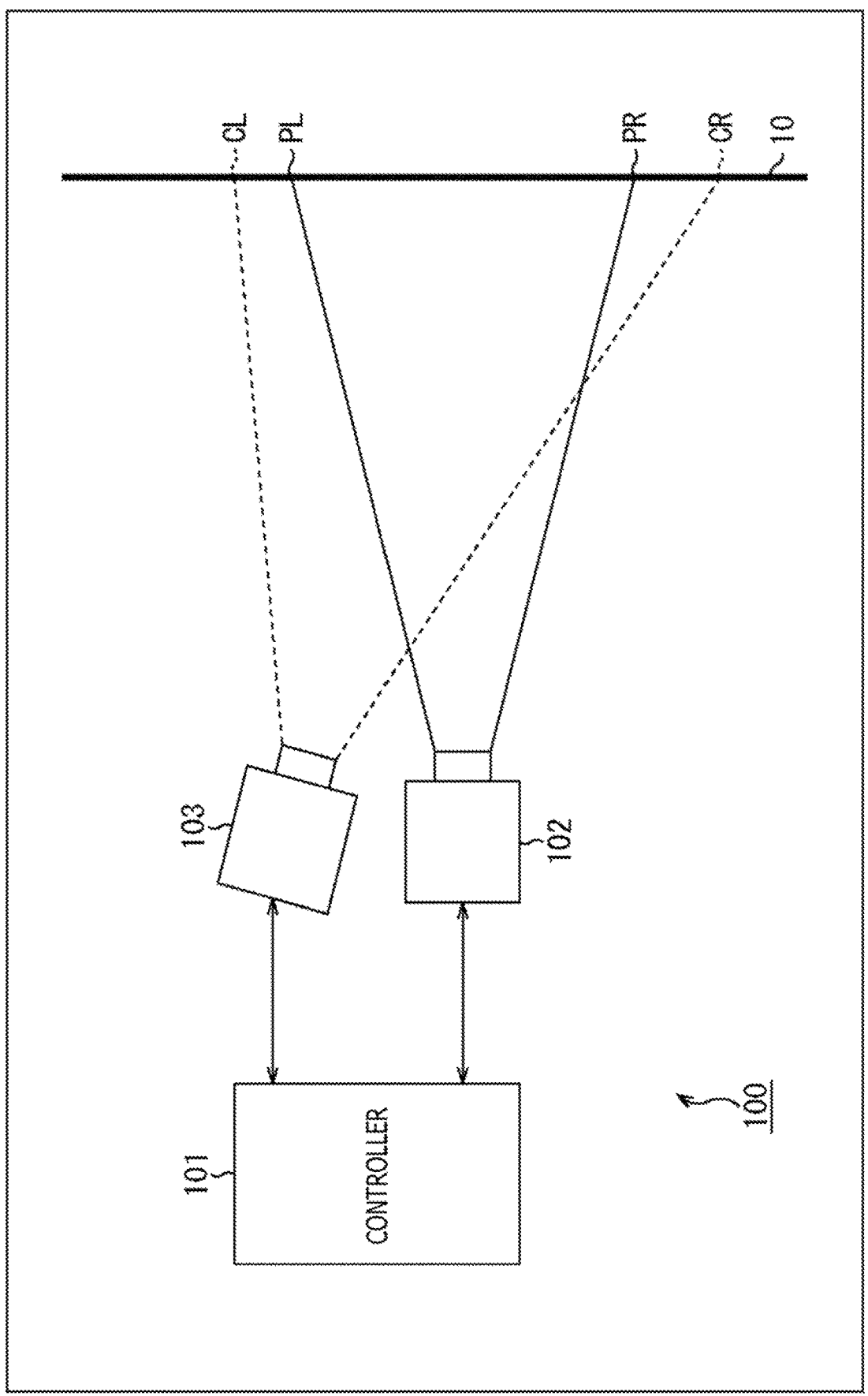
FIG. 1 is a diagram illustrating an example of a configuration of principal parts of a projection imaging system.

Modes for carrying out the present disclosure (hereinafter, referred to as "embodiments") will be described hereinafter. It is noted that description will be given in the following order.

1. First embodiment (projection imaging system)
2. Second embodiment (projection imaging system: synchronization)
3. Third embodiment (projection imaging system: positioning pattern)
4. Fourth embodiment (projection imaging system: fast imaging)
5. Fifth embodiment (projection imaging system/projection imaging apparatus: other configurations)
6. Others 1. First Embodiment <Geometric Correction of Projected Image>

An image that is projected (also referred to as "projected image") is often distorted and difficult to view depending on a posture (a position, an orientation, and the like) of a projector with respect to a projection plane (a screen, a wall, or the like). In such a case, it is possible to reduce a distortion in the projected image and make the projected image easy to view by performing geometric correction, such as distortion correction, on the image projected by the projector.

In the present specification, the correction such as deformation, movement, enlargement, or reduction of a projected image, for changing a position of each pixel in the projected image on the projection plane will be referred to as "geometric correction." In other words, it is assumed that the "geometric correction" includes correction by not only image processing but also by optical control such as shifting and zooming, control over a posture and the like of a projection section, and the like. In addition, in the present specification, it is assumed that "postures" of the projection section, an imaging section, and the like include not only "orientations" of the sections (orientation of projection and orientation of imaging) but also "positions" of the sections (positions at which the projection and the imaging are performed).

While the geometric correction described above can be performed manually by an operator or the like who operates the projector, this may need complicated work.

Therefore, a method of capturing a projected image projected by the projector using a camera and setting the geometric correction using the captured image has been proposed. In this case, postures of the camera and the projector, a screen shape, and the like are estimated from the projected image contained in the captured image, and appropriate geometric correction is set in accordance with the estimations.

<Online Sensing>

Such setting of the geometric correction is often necessary not only before projection of content (moving image) but also during projection of the content. For example, changing the posture of the projector during projection of the content causes a distortion in the projected image. In such a case, it is necessary to re-estimate the posture of this projector to appropriately set the geometric correction. However, interrupting the projection of the content for the re-estimation unfavorably prevents a user who is viewing/listening the content from viewing/listening the content. To address the problem, therefore, a method (online sensing) for detecting correspondence points while continuing to project the content has been proposed.

Examples of the online sensing technique are considered to include a scheme such as Infrared using invisible light, a scheme such as SIFT (Scale-Invariant Feature Transform) using image feature amounts, and an ISL (Imperceptible Structured Light) scheme. In a case of the scheme such as Infrared using invisible light, it is additionally necessary to use a projector that projects invisible light (for example, an Infrared projector), which possibly increases a cost. In addition, in a case of the scheme such as the SIFT using image feature amounts, detection accuracy and density of correspondence points depend on image content to be projected; thus, it is difficult to perform correspondence point detection at stable accuracy.

In a case of the ISL scheme, which uses visible light, by contrast, it is possible to suppress an increase in the number of system constituent elements (that is, a cost increase). Furthermore, with the ISL scheme, the correspondence point detection can be performed at the stable accuracy without depending on the image to be projected.

<ISL Scheme>

In the ISL scheme, pattern images that are images of predetermined patterns are embedded in an image of content and projected in such a manner as to be imperceptible to a person using an integration effect. In addition, correspondence points are detected using the pattern images. More specifically, a positive image and a negative image as predetermined pattern images (Structured Light) are superimposed on an input image (image of a content), and two frames, that is, a positive frame (Pos Frame) and a negative frame (Neg Frame) are generated. These two frames are sequentially projected by a projector. The positive image out of the pattern images (also referred to as a "positive pattern image") and the negative image out of the pattern images (also referred to as "negative pattern image") are opposite in a pattern luminance value changing direction (for example, white and black); thus, continuously projecting these two frames from the projector makes it difficult for a user to perceive the pattern images (the positive image and the negative image) by the integration effect.

By contrast, a camera driven by a global shutter scheme operates synchronously with projection by the projector and captures projected images of the two frames. The captured images each contain the positive image and the negative image as the pattern images. Therefore, by obtaining a difference between these captured images, the image of the content is erased, and the pattern images are extracted. It is possible to detect correspondence points of pixels between the projector and the camera using the pattern images. In other words, it is possible to realize grasping of a state of the projected image at a lower cost.

However, in a case of executing this method using an inexpensive rolling shutter camera, projected images of a plurality of frames are reflected in a captured image of one frame, which makes it difficult to extract the pattern images from the captured image. Owing to this, it is necessary to use an expensive global shutter camera to grasp a state of the projected images, which possibly results in a cost increase.

Such a camera has a configuration that is not to be directly involved in image projection but an auxiliary configuration for correction of the projected images. Owing to this, even in a case in which this camera is equipped with, for example, expensive functions, the functions do not contribute to directly improvement in an image quality such as improvement in a resolution of the projected images. In many cases, the camera having such an auxiliary configuration is required to be realized at a cost as low as possible without particularly achieving excessive performance improvement. Thus, it is desired to realize such a camera using a rolling shutter camera at the lower cost than that of the global shutter camera; however, it is difficult to realize the camera as described above.

To address the difficulty, the projected image onto which the predetermined pattern images opposite to each other, that is, positive and negative pattern images are sequentially projected is captured at a higher frame rate than that of the projected image using the rolling shutter scheme, and a difference between discontinuous frames of a captured image configured with a plurality of frames obtained by the capture is calculated. It is thereby possible to realize online sensing based on the ISL scheme using the camera driven by the rolling shutter scheme. In other words, it is possible to realize grasping of the state of the projected image at a lower cost.

<Projection Imaging System>

FIG. 1 is a block diagram illustrating an example of a configuration of principal parts of one embodiment of a projection imaging system to which the present technique is applied. In FIG. 1, a projection imaging system 100 is a system that can project an image, capture a projected image, and detect correspondence points by the ISL scheme using a method to which the present technique is applied.

As depicted in FIG. 1, the projection imaging system 100 has a controller 101, a projection apparatus 102, and an imaging apparatus 103. The projection apparatus 102 and the imaging apparatus 103 are communicably connected to the controller 101.

Communication realizing this connection and a communication medium for the communication are arbitrarily set. For example, the projection apparatus 102 and the imaging apparatus 103 may be connected to the controller 101 via a dedicated cable, connected thereto via a cable under a predetermined standard such as an HDMI (registered trademark) (High-Definition Multimedia Interface) or a USB (Universal Serial Bus), or may be connected thereto via a predetermined network (communication network) such as a LAN (Local Area Network) or the Internet. In addition, the projection apparatus 102 and the imaging apparatus 103 may be connected to the controller 101 by arbitrary wireless communication, which is, for example, Bluetooth (registered trademark) communication, short-range wireless communication such as an NFC (Near Field Communication), infrared communication, or a wireless LAN compliant with IEEE (Institute of Electrical and Electronic Engineers) 802.11. Furthermore, the projection apparatus 102 and the imaging apparatus 103 may be connected to the controller 101 via a plurality of types of communication media, for example, via the wireless LAN and the Internet.

The controller 101 is an embodiment of an image processing apparatus or a control section to which the present technique is applied, and controls the projection apparatus 102 and the imaging apparatus 103 to operate. In addition, the controller 101 performs a process associated with correction of an image projected by the projection apparatus 102, or the like using a captured image obtained by the imaging apparatus 103.

The projection apparatus 102 is an embodiment of an image processing apparatus or a projection section to which the present technique is applied and is configured with, for example, a projector. The projection apparatus 102 projects an image supplied from the controller 101 onto a screen 10. The imaging apparatus 103 is an embodiment of an image processing apparatus or an imaging section to which the present technique is applied and is configured with, for example, a camera. The imaging apparatus 103 images a screen 10 onto which the projected image is projected. At this time, as depicted in FIG. 1, the projection apparatus 102 projects the image onto a range from PL to PR on the screen 10. In addition, the imaging apparatus 103 images a range from CL to CR on the screen 10. In other words, the imaging apparatus 103 images the screen 10 in an imaging range that encompasses the entire projected image. While a lateral direction of the projected image is depicted in FIG. 1, the same applies to a longitudinal direction. It is noted that the imaging apparatus 103 is driven by the rolling shutter scheme. The imaging apparatus 103 supplies an obtained captured image of the projected image to the controller 101.

<Controller>

Figure 2:
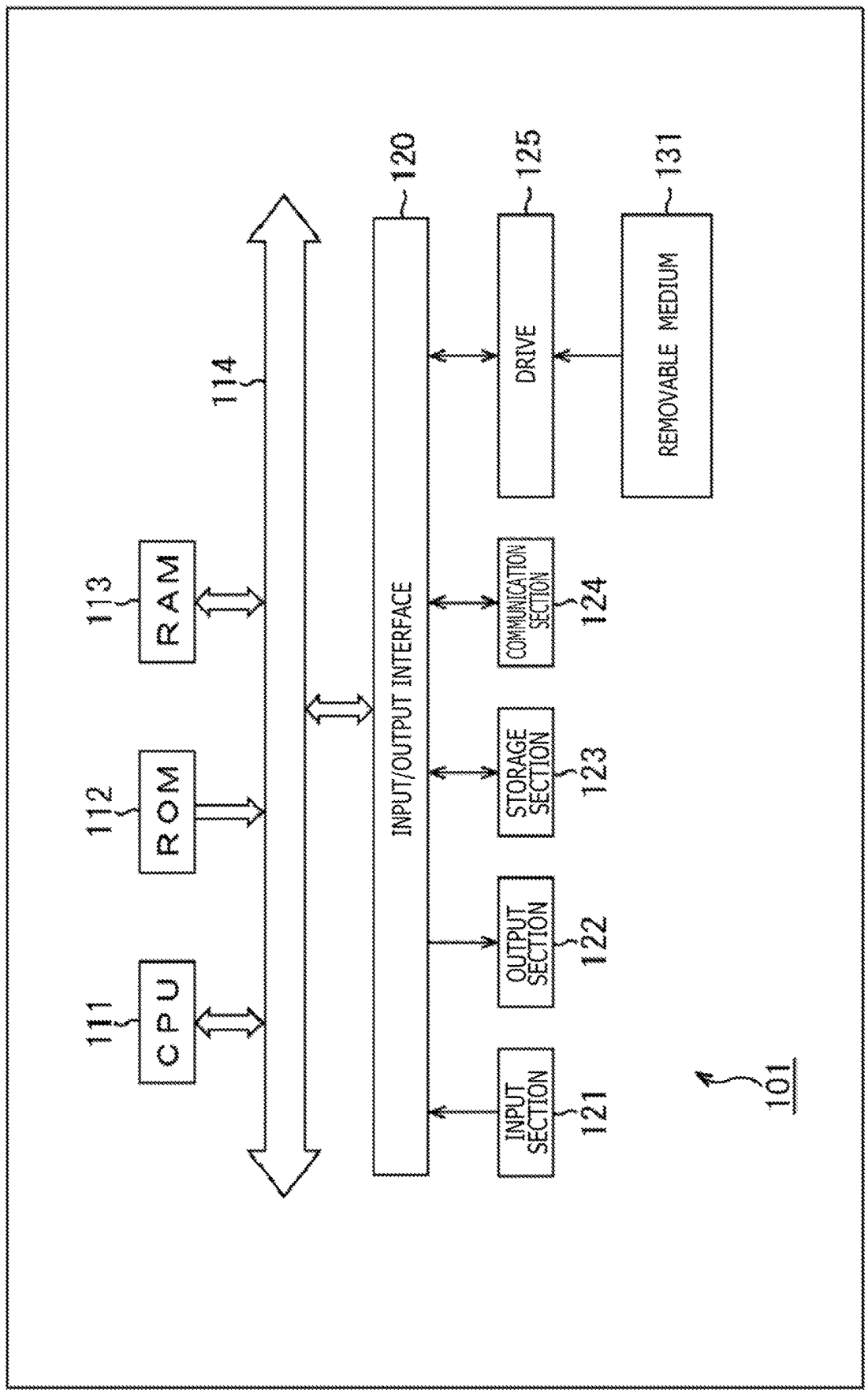
FIG. 2 is a block diagram illustrating an example of a configuration of principal parts of a controller.

FIG. 2 is a block diagram illustrating an example of a configuration of principal parts of the controller 101 that is one embodiment of the image processing apparatus to which the present technique is applied.

As depicted in FIG. 2, the controller 101 has a CPU (Central Processing Unit) 111, a ROM (Read Only Memory) 112, a RAM (Random Access Memory) 113, a bus 114, an input/output interface 120, an input section 121, an output section 122, a storage section 123, a communication section 124, and a drive 125.

The CPU (Central Processing Unit) 111, the ROM (Read Only Memory) 112, and the RAM (Random Access Memory) 113 are mutually connected via the bus 114. The input/output interface 120 is also connected to the bus 114. The input section 121, the output section 122, the storage section 123, the communication section 124, and the drive 125 are connected to the input/output interface 120.

The CPU 111 performs various processes by, for example, loading a program and the like stored in the ROM 112 and the storage section 123 to the RAM 113 to execute the program and the like. Data and the like necessary for the CPU 111 to execute the various processes are also stored in the RAM 113 as appropriate.

For example, the CPU 111 can perform a process associated with grasping of a situation of image projection by executing the program and the like as described above.

The input section 121 includes an input device that receives, for example, external arbitrary information such as a user input. An arbitrary type of device may be used as this input device. For example, the input device may be a keyboard, a mouse, an operation button, a touch panel, a camera, a microphone, and a barcode reader. Alternatively, the input device may be various kinds of sensors such as an acceleration sensor, an optical sensor, and a temperature sensor. As another alternative, the input device may be an input terminal that receives the external arbitrary information as data (signals). The output section 122 includes an output device that outputs arbitrary information stored in the controller 101 such as images and sounds. An arbitrary type of device may be used as this output device. For example, the output device may be a display and a loudspeaker. Alternatively, the output device may be an output terminal that outputs the arbitrary information to the outside as data (signals).

The storage section 123 includes a storage medium that stores information such as a program and data. An arbitrary type of medium may be used as this storage medium. For example, the storage medium may be a hard disk, a RAM disk, or a nonvolatile memory. The communication section 124 includes a communication device that performs communication for transmitting and receiving information such as a program and data to and from external apparatuses via a predetermined communication medium (for example, an arbitrary network such as the Internet). An arbitrary type of device may be used as this communication device. For example, the communication device may be a network interface. A communication method and a communication standard for communication performed by this communication section 124 are arbitrary. For example, the communication section 124 may be able to perform wired communication, wireless communication, or both the wired communication and the wireless communication.

The drive 125 performs processes associated with reading and writing of information (program, data, and the like) from and to a removable medium 131 attached to the drive 125. An arbitrary recording medium may be used as this removable medium 131. For example, the removable medium 131 may be a magnetic disk, an optical disk, a magneto-optical disk, or a semiconductor memory. For example, the drive 125 reads information (program, data, and the like) stored in the removable medium 131 attached to the drive 125 and supplies the information to the CPU 111, the RAM 113, and the like. In addition, for example, the drive 125 acquires information (program, data, and the like) supplied from the CPU 111, the RAM 113, and the like and writes the information to the removable medium 131 attached to the drive 125.

<Functional Blocks of Controller>

Figure 3:
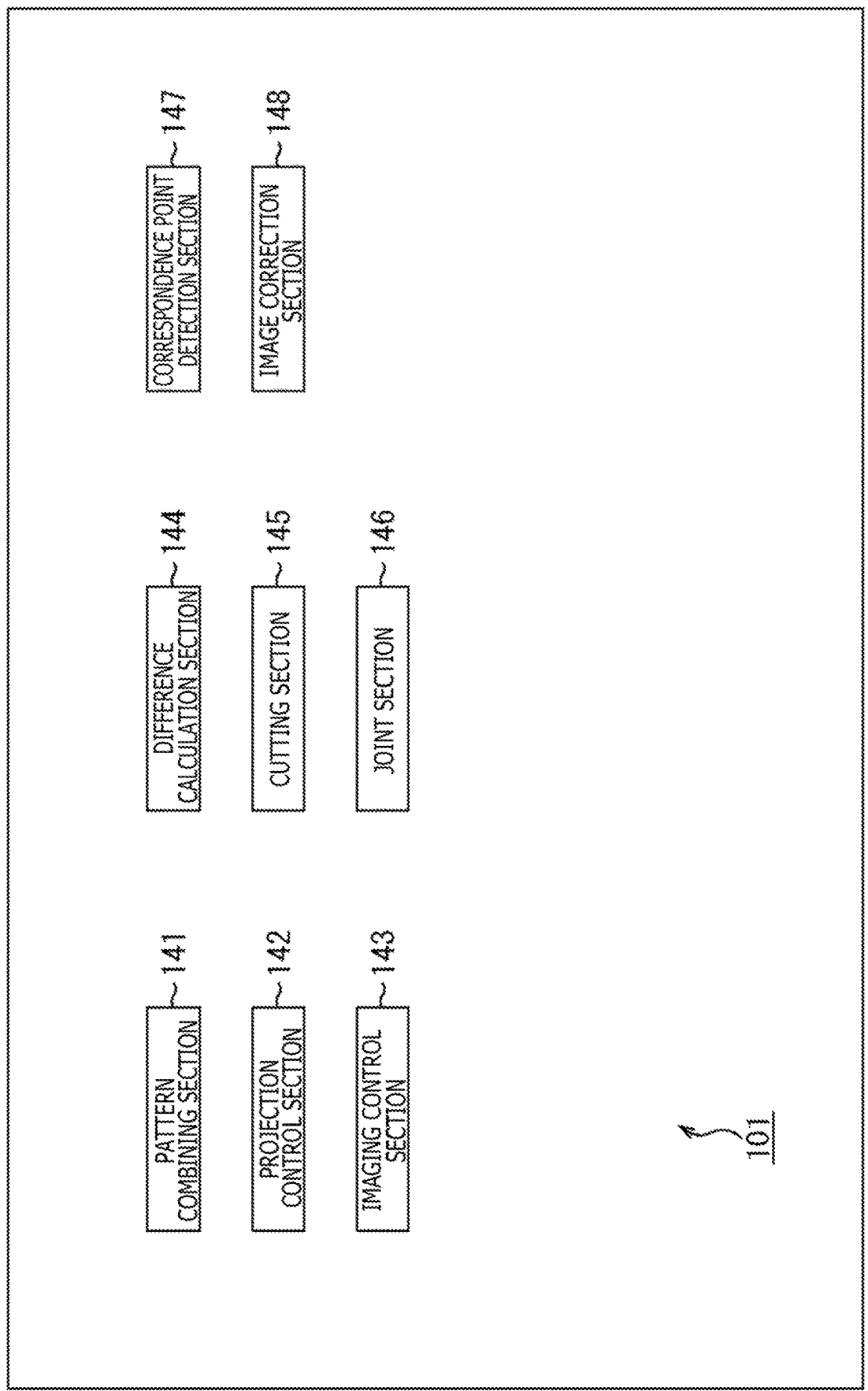
FIG. 3 is a functional block diagram illustrating an example of functions realized by the controller.

FIG. 3 is a functional block diagram illustrating an example of functions realized by executing a program and the like by the controller 101. As depicted in FIG. 3, by executing the program, the controller 101 has functions of, for example, a pattern combining section 141, a projection control section 142, an imaging control section 143, a difference calculation section 144, a cutting section 145, a joint section 146, a correspondence point detection section 147, and an image correction section 148.

The pattern combining section 141 performs a process associated with combining pattern images with a content (moving image). The projection control section 142 performs a process associated with control over the projection apparatus 102. The imaging control section 143 performs a process associated with control over the imaging apparatus 103. The difference calculation section 144 performs a process associated with calculation of a difference between frames of the captured image. The cutting section 145 performs a process associated with extraction of desired regions from difference images. The joint section 146 performs a process associated with joint of regions. The correspondence point detection section 147 performs a process associated with detection of correspondence points of pixels between the projection apparatus 102 and the imaging apparatus 103. The image correction section 148 performs a process associated with image correction.

It is noted that the functional blocks can mutually transmit and receive information (for example, an instruction and data) as needed. In addition, the controller 101 may have functions other than these functions.

<Combining of Pattern Images>

Figure 4:
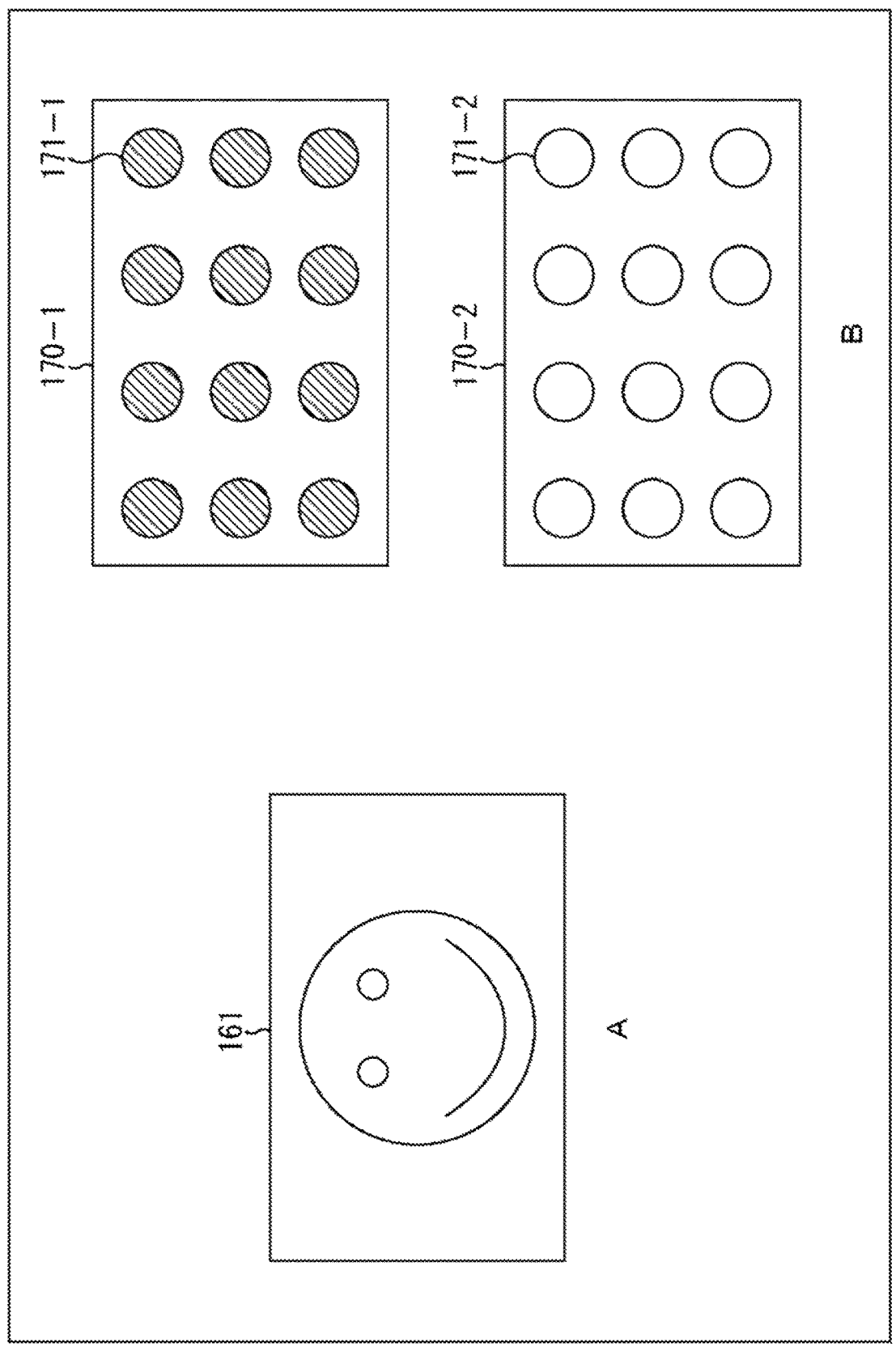
FIG. 4 illustrates an example of an image to be projected and pattern images.

The pattern combining section 141 performs combining such that pattern images are superimposed on a frame image of content. A frame image 161 depicted in A of FIG. 4 is a frame image of the content to be projected. It is noted that a design of this frame image is arbitrary and not limited to an example of A of FIG. 4. The pattern combining section 141 superimposes pattern images 170-1 and 170-2 depicted in B of FIG. 4 on this frame image 161 and generates two superimposed images.

The pattern image 170-1 is an image that contains a pattern 171-1 that can be used to detect a corresponding point of a pixel between the projection apparatus 102 and the imaging apparatus 103. While it is depicted in B of FIG. 4 that the pattern 171-1 is configured with a circular pattern, the pattern 171-1 may be configured with any design of pattern as long as the correspondence point can be detected. It is noted that a luminance value of the pattern 171-1 changes in a positive direction, compared with peripheral parts other than the pattern. In other words, the pattern image 170-1 is a positive pattern image.

Similarly to the pattern image 170-1, the pattern image 170-2 is an image that contains a pattern 171-2 that can be used to detect a correspondence point of a pixel between the projection apparatus 102 and the imaging apparatus 103. This pattern 171-2 is configured with a pattern identical in design to the pattern 171-1 and a luminance value thereof changes in a negative direction, compared with peripheral parts other than the pattern. In other words, the pattern 171-2 is configured with a pattern identical in design to the pattern 171-1 and opposite in luminance value changing direction to the pattern 171-1. In other words, the pattern image 170-2 is a negative pattern image.

In the following description, the pattern images 170-1 and 170-2 will be referred to as "pattern images 170" in a case of no need to describe the pattern images 170-1 and 170-2 in a discriminating manner. In addition, the patterns 171-1 and 171-2 will be referred to as "patterns 171" in a case of no need to describe the patterns 171-1 and 171-2 in a discriminating manner.

<Projection and Imaging of Superimposed Images>

The projection control section 142 sequentially supplies the superimposed images generated by the pattern combining section 141 as described above to the projection apparatus 102 to cause the projection apparatus 102 to project superimposed images. A manner of projection is depicted in an upper stage of FIG. 5. For example, the projection control section 142 projects the superimposed images onto the screen 10 at a frame rate of 30 Hz. Each of the above superimposed images is projected as one frame; thus, a superimposed image 181 obtained by superimposing the positive pattern image 170-1 on the frame image 161 of the content is projected for approximately ⅟₃₀ second, and a superimposed image 182 obtained by superimposing the negative pattern image 170-2 on the frame image 161 of the content is projected for next approximately ⅟₃₀ second.

If the imaging apparatus 103 is driven by the global shutter scheme, the imaging apparatus 103 may capture the frame of the superimposed image 181 and the frame of the superimposed image 182 by capturing the frames at a frame rate of 30 Hz synchronously with the projection of the superimposed images. Further, a difference between continuous frames of the captured image is obtained, thereby making it possible to remove the frame image 161 of the content and extract the pattern images 170. In other words, during the projection of the content, it is possible to project the pattern images 170 in such a manner that the pattern images 170 are not visually recognizable by a viewer, and detect the pattern images 170. It is, therefore, possible to detect correspondence points and yet update setting of image correction during the projection of the content.

Nevertheless, in a case in which the imaging apparatus 103 is a rolling shutter imaging apparatus, exposure timing and readout timing differ among pixel rows (lower pixel rows are delayed in timing); thus, each of the frames of the captured image becomes an image in which a plurality of frames of the projected image are mixed. Owing to this, even if the difference between the continuous frames of the captured image is obtained, there is a concern that a part in which the pattern images 170 disappear or a part in which the image of the content remains are generated and accordingly, the pattern images 170 cannot be extracted appropriately.

Figure 5:
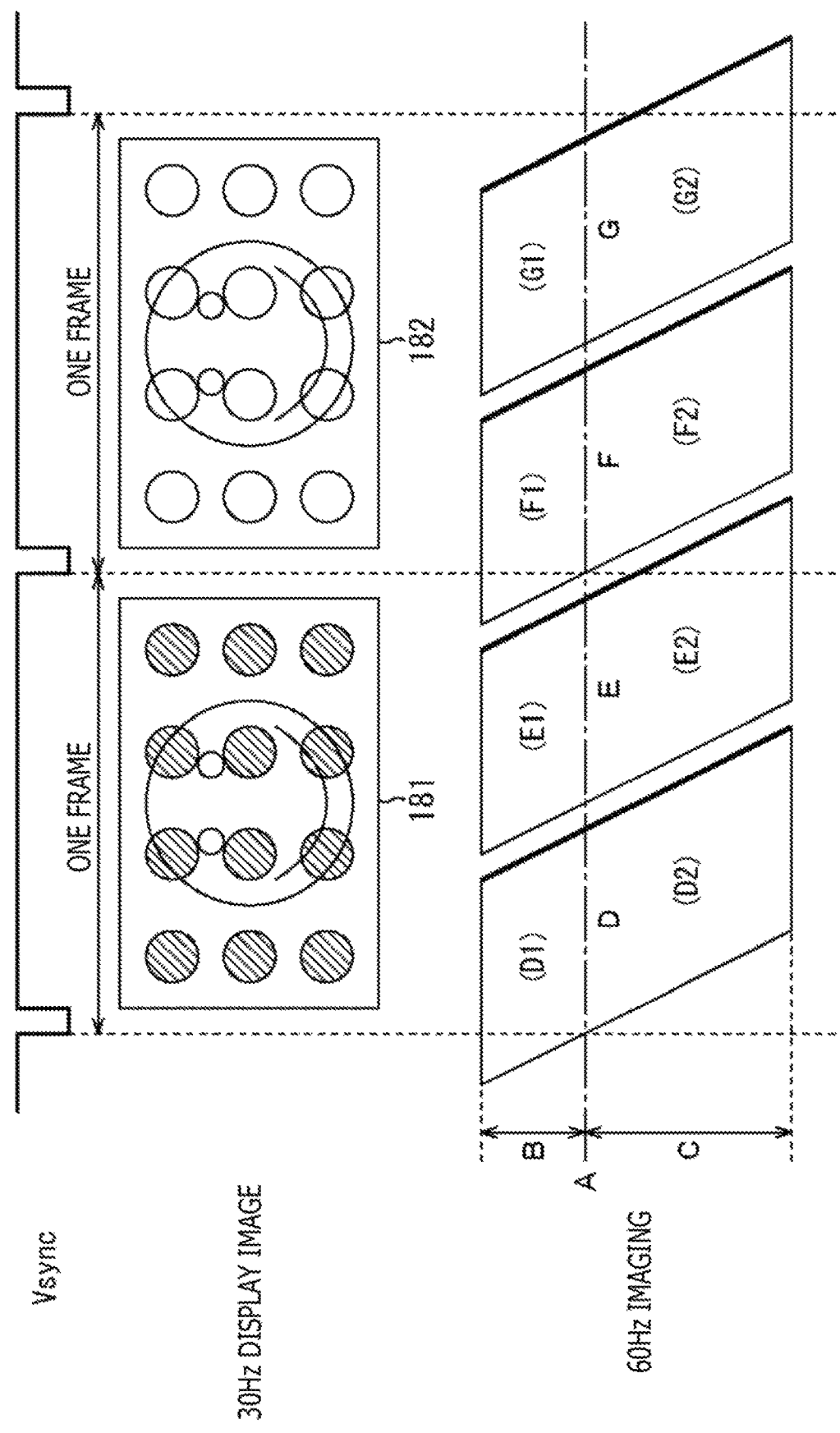
FIG. 5 is a timing chart illustrating an example of a relationship between projection and imaging.

Thus, a frame rate of imaging is set twice as high as that of projection. More specifically, as depicted in a lower stage of FIG. 5, the frame rate of the captured image is set to 60 Hz. Each rhombus depicted in the lower stage of FIG. 5 indicates exposure time per frame of the captured image. A lateral direction of this rhombus in FIG. 5 indicates time, while a longitudinal direction therein indicates a pixel row. Since the imaging apparatus 103 is driven by the rolling shutter scheme, the exposure timing and the readout timing differ among pixel rows (lower pixel rows are delayed in timing). This is why the exposure time is indicated by the rhombus as depicted in FIG. 5.

In this case, therefore, a plurality of frames of the projected image are possibly mixed in each frame of the captured image. For example, in a frame D, not only the frame of the superimposed image 181 but also a frame just before the frame of the superimposed image 181 is exposed in a region D1 in a range indicated by a double-headed arrow B above a predetermined pixel row A. In addition, in a next frame E, not only the frame of the superimposed image 181 but also a frame next to the frame of the superimposed image 181 is exposed in a region E2 in a range indicated by a double-headed arrow C below the predetermined pixel row A. Likewise, in a frame F, not only the frame of the superimposed image 182 but also the frame of the superimposed image 181 just before the frame of the superimposed image 182 is exposed in a region F1 in the range indicated by the double-headed arrow B above the predetermined pixel row A. In addition, in a next frame G, not only the frame of the superimposed image 182 but also a frame next to the frame of the superimposed image 182 is exposed in a region G2 in the range indicated by the double-headed arrow C below the predetermined pixel row A.

Therefore, similarly to a case in which the imaging apparatus 103 is a global shutter imaging apparatus, if the difference between the continuous frames of the captured image is obtained, the pattern images 170 disappear, or the image of the content remains, and as a result, there is a concern that the pattern images 170 cannot be extracted appropriately.

Figure 6:
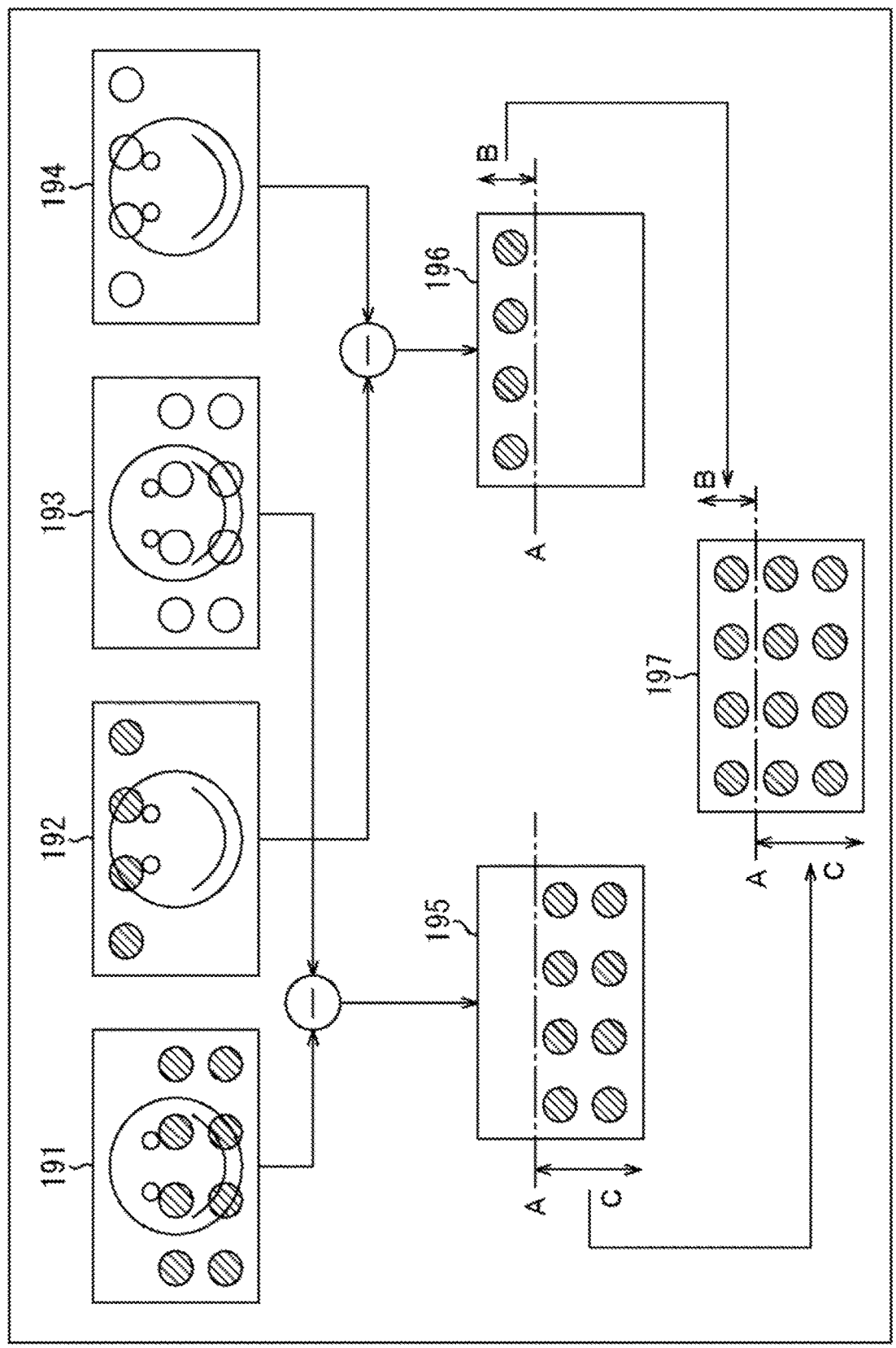
FIG. 6 is an illustrative diagram of an example of a manner of extracting pattern images.

To address the problem, the difference calculation section 144 further calculates a difference between every other frames (frames at two-frame intervals) of the captured image. For example, as depicted in FIG. 6, it is assumed that the imaging apparatus 103 obtains a captured image 191 of the frame D, a captured image 192 of the frame E, a captured image 193 of the frame F, and a captured image 194 of the frame G. The difference calculation section 144 calculates a difference between the captured image 191 of the frame D and the captured image 193 of the frame F, and calculates a difference between the captured image 192 of the frame E and the captured image 194 of the frame G.

As described above, in the region D1 above the pixel row A in the captured image 191, not only an image of the frame of the superimposed image 181 but also an image of the frame just before the frame of the superimposed image 181 is mixed. In addition, in the region F1 above the pixel row A in the captured image 193, not only an image of the frame of the superimposed image 182 but also the superimposed image 181 is mixed. Therefore, in a region above the pixel row A in a difference image 195 between the captured images 191 and 193, the pattern images 170 disappear or the image 161 of the content remains. Thus, the cutting section 145 cuts and extracts a region below the pixel row A in the difference image 195.

Likewise, in the region E2 below the pixel row A in the captured image 192, not only an image of the frame of the superimposed image 181 but also the superimposed image 182 is mixed. Likewise, in the region G2 below the pixel row A in the captured image 194, not only an image of the frame of the superimposed image 182 but also an image of the frame just after the superimposed image 182 is mixed. Therefore, in a region below the pixel row A in a difference image 196 between the captured images 192 and 194, the pattern images 170 disappear or the image 161 of the content remains. Thus, the cutting section 145 cuts and extracts a region above the pixel row A in the difference image 196.

Furthermore, the joint section 146 joins the region extracted from the difference image 195 with the region extracted from the difference image 196, and generates a pattern image 197 corresponding to one frame. The correspondence point detection section 147 detects correspondence points using this pattern image 197. In addition, the image correction section 148 corrects the image to be projected using the detected correspondence points.

By doing so, even if the imaging apparatus 103 is driven by the rolling shutter scheme, the controller 101 can control to project the pattern images 170 such that the pattern images 170 are not visually recognized by the viewer during projection of the content and to detect the pattern images 170. It is, therefore, possible to detect correspondence points and yet update setting of image correction during the projection of the content. In other words, it is possible to realize grasping of a state of the projected image at a lower cost.

<Flow of Projection Control Process>

Next, a process executed by the projection imaging system 100 configured as described above will be described. As described above, the controller 101 in the projection imaging system 100 controls the projection apparatus 102 to project content (moving image). An example of a flow of a projection control process executed by the controller 101 to project such content will be described with reference to the flowchart of FIG. 7.

When the projection control process is started, the pattern combining section 141 in the controller 101 superimposes the positive pattern image and the negative pattern image on the frame image of the content (moving image) to be projected in Step S101.

In Step S102, the projection control section 142 sequentially supplies the superimposed images obtained in Step S101 to the projection apparatus 102, and controls the projection apparatus 102 to project the superimposed images onto the screen 10 at a frame rate (projection frame rate) twice as high as a frame rate of the content (moving image).

In Step S103, the imaging control section 143 controls the imaging apparatus 103 driven by the rolling shutter scheme to capture the projected image projected onto the screen 10 by the process of Step S102 at a frame rate (imaging frame rate) twice as high as the projection frame rate.

In Step S104, the difference calculation section 144 calculates a difference between odd-numbered frames and a difference between even-numbered frames among the four frames (frames D to G of FIG. 5) of the captured image obtained by the process of Step S103 and corresponding to identical frames of the content (moving image).

In Step S105, the cutting section 145 extracts a pattern detectable region from each of the difference images obtained by the process of Step S104.

In Step S106, the joint section 146 joins the regions extracted from the individual difference images by the process of Step S105, and generates the pattern image corresponding to one frame.

In Step S107, the correspondence point detection section 147 detects correspondence points of pixels between the projection apparatus 102 and the imaging apparatus 103 on the basis of the pattern image corresponding to one frame and obtained by the process of Step S106.

In Step S108, the image correction section 148 geometrically corrects the superimposed images projected onto the screen 10 on the basis of the correspondence points obtained by the process of Step S107.

When the process of Step S108 is ended, the projection control process is ended. In this way, by executing the projection control process, the projection imaging system 100 can realize grasping of the state of the projected image at a lower cost.

2. Second Embodiment

<Synchronization>

Figure 8:
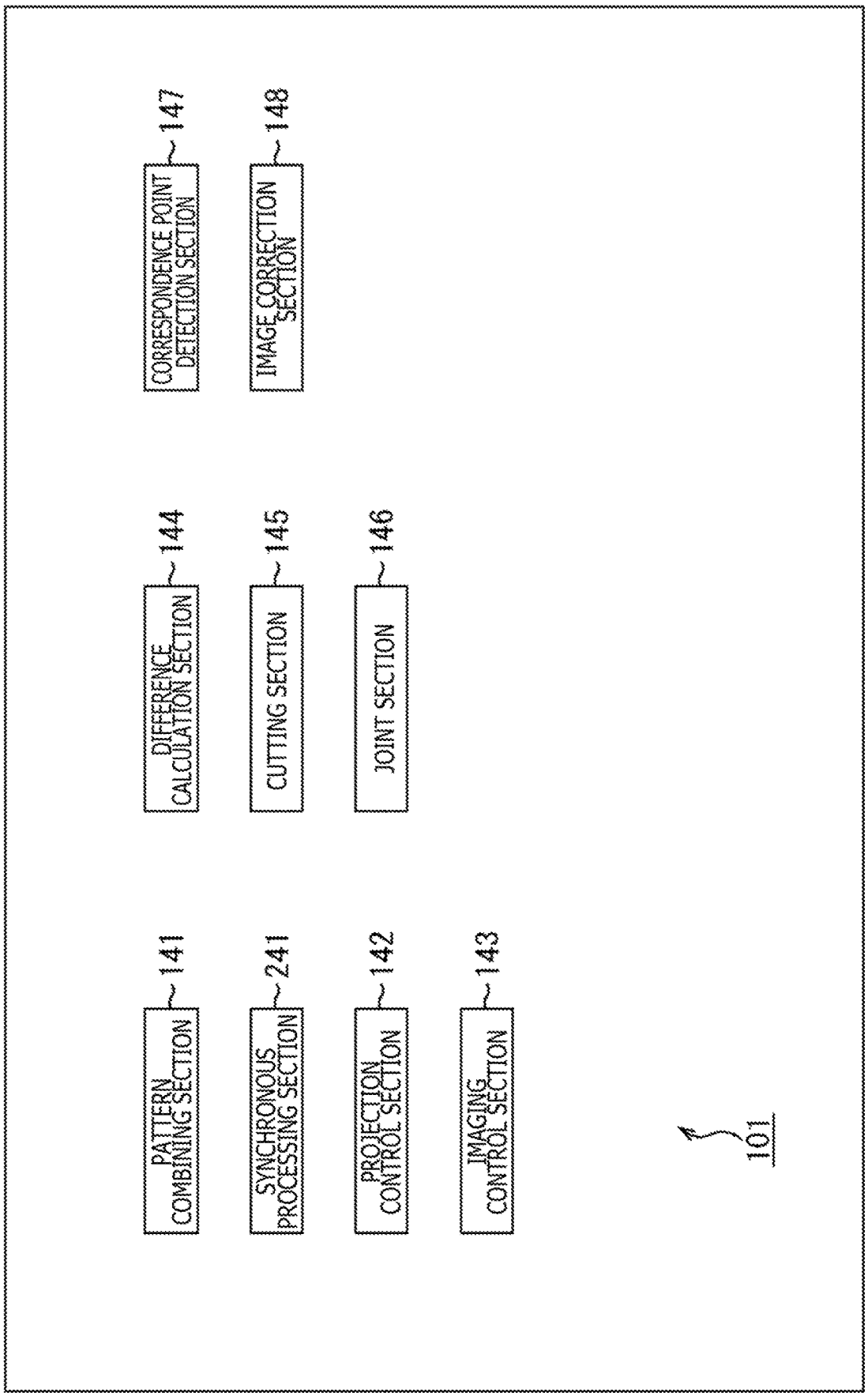
FIG. 8 is a functional block diagram illustrating an example of functions realized by the controller.

The projection imaging system 100 described in the first embodiment may synchronize projection timing with imaging timing. FIG. 8 is a functional block diagram illustrating an example of functions realized by the controller 101 in that case. As depicted in FIG. 8, in this case, the controller 101 has a function of, for example, a synchronous processing section 241 in addition to the functions (FIG. 3) described in the first embodiment.

The synchronous processing section 241 performs a process associated with synchronization of operation timing. For example, the synchronous processing section 241 synchronizes timing of projection by the projection apparatus 102 with timing of imaging by the imaging apparatus 103. By synchronizing in this manner, a position of the pixel row A of FIG. 5 has been known; thus, the cutting section 145 cuts regions on the basis of the known pixel row A, thereby making it possible to cut and extract pattern detectable regions more accurately.

<Flow of Projection Control Process>

Figure 9:
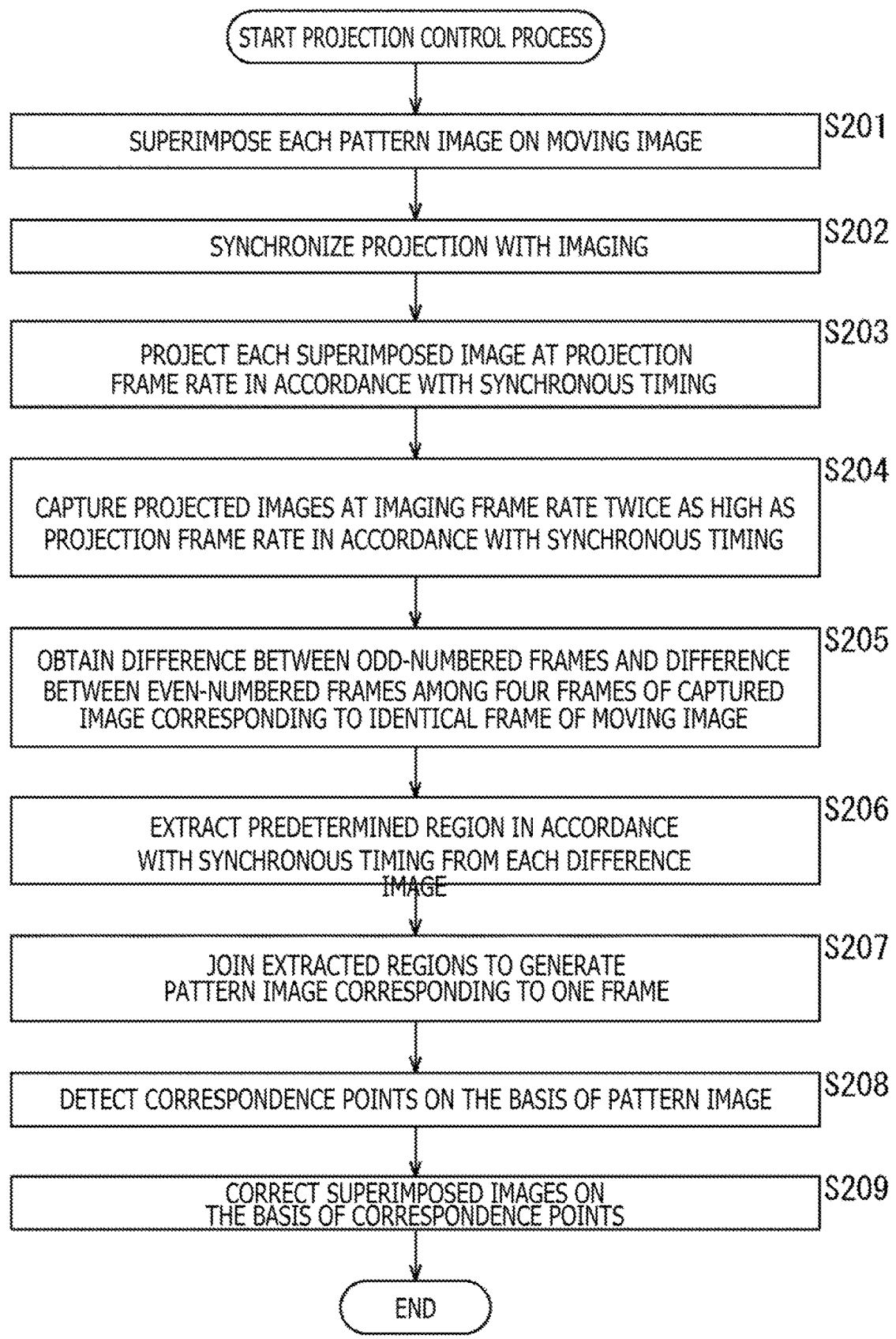
FIG. 9 is a flowchart illustrating an example of a flow of a projection control process.

An example of a flow of a projection control process in this case will be described with reference to the flowchart of FIG. 9.

When the projection control process is started, the pattern combining section 141 in the controller 101 superimposes the positive pattern image and the negative pattern image on the frame image of the content (moving image) to be projected in Step S201.

In Step S202, the synchronous processing section 241 controls the projection control section 142 and the imaging control section 143 to synchronize the timing of projection by the projection apparatus 102 with the timing of imaging by the imaging apparatus 103.

In Step S203, the projection control section 142 sequentially supplies the superimposed images obtained in Step S201 to the projection apparatus 102, and controls the projection apparatus 102 to project the superimposed images onto the screen 10 at the frame rate (projection frame rate) twice as high as the frame rate of the content (moving image) in accordance with the synchronous timing set by the process of Step S202.

In Step S204, the imaging control section 143 controls the imaging apparatus 103 driven by the rolling shutter scheme to capture the projected image projected onto the screen 10 by the process of Step S203 at the frame rate (imaging frame rate) twice as high as the projection frame rate in accordance with the synchronous timing set by the process of Step S202.

In Step S205, the difference calculation section 144 calculates a difference between odd-numbered frames and a difference between even-numbered frames among the four frames (frames D to G of FIG. 5) of the captured image obtained by the process of Step S103 and corresponding to identical frames of the content (moving image).

In Step S206, the cutting section 145 extracts a predetermined region from each of the difference images obtained by the process of Step S104 in accordance with the synchronous timing set by the process of Step S202. In other words, the cutting section 145 extracts the regions above or below the known pixel row A, that is, pattern detectable regions in accordance with the synchronous timing.

Processes from Steps S207 to S209 are similarly executed to those from Steps S106 to S108.

When the process of Step S209 is ended, the projection control process is ended. In this way, by executing the projection control process, the projection imaging system 100 can cut and extract the pattern detectable regions more accurately. Also in this case, the projection imaging system 100 can realize grasping of the state of the projected image at a lower cost.

3. Third Embodiment

<Positioning Pattern>

In a case in which a region where a plurality of frames of the projected image are mixed in the captured image as described above, it is possible to grasp the state of the projected image more accurately by extracting pattern detectable regions that do not contain such region. In other words, identifying a pixel row (for example, the pixel row A) that serves as a boundary between the region where the plurality of frames of the projected image are mixed and the pattern detectable regions more accurately makes it possible to grasp the state of the projected image more accurately.

Thus, to obtain the boundary (pixel row) described above, a pattern available for identifying a pixel row of the projected image may be contained in the pattern images. For example, as depicted in A of FIG. 10, a positioning pattern 310 may be provided in each pattern image. This positioning pattern 310 is a pattern formed near left, right, upper, and lower ends of the projected image (by as much as, for example, several pixels) and a design and a marking may be arbitrary. For example, the positioning pattern 310 have a uniform luminance or may have a design or a marking of some sort.

Figure 10:
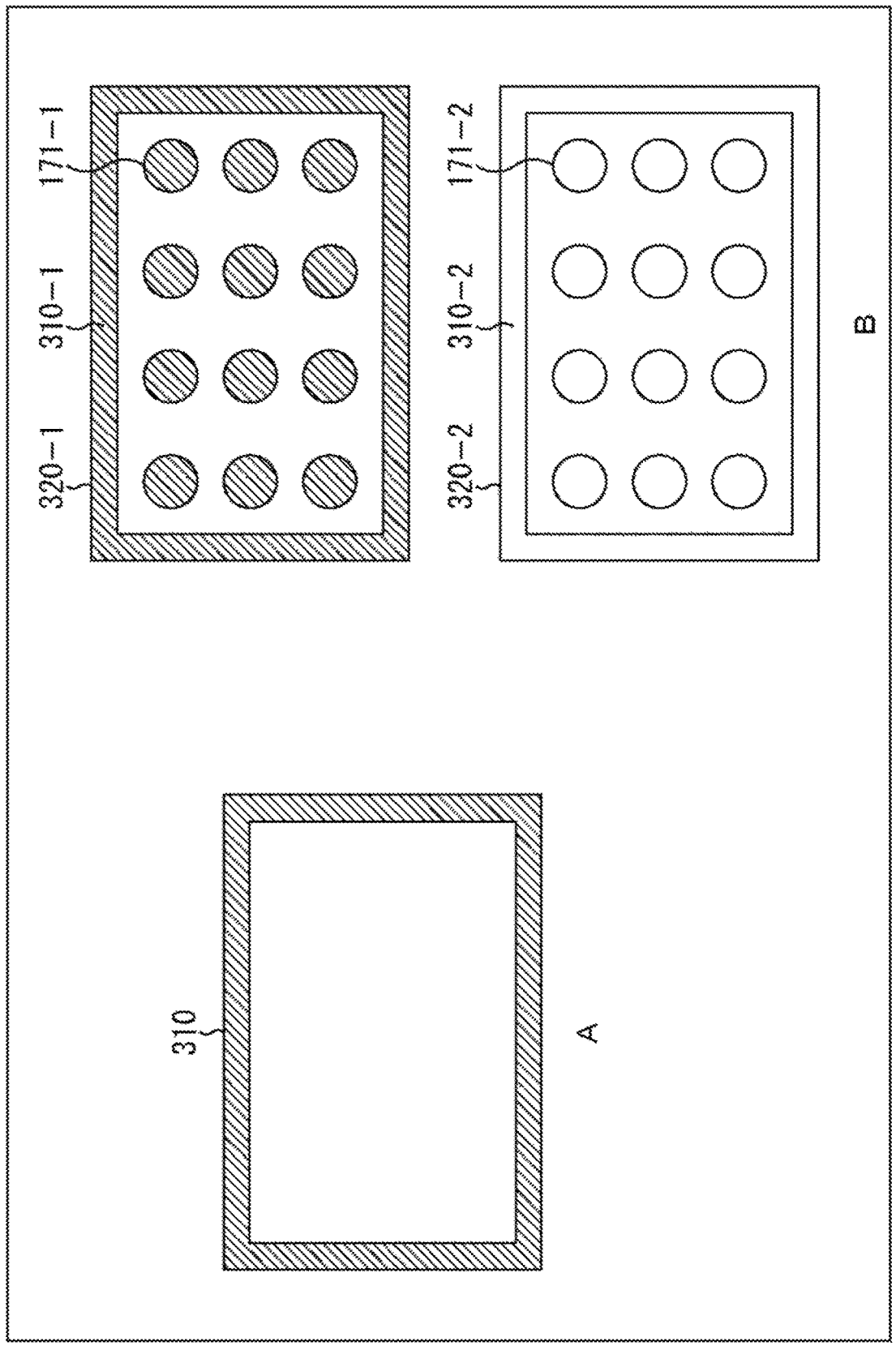
FIG. 10 is a diagram illustrating an example of pattern images.

In other words, in this case, the pattern image is as depicted in B of FIG. 10. In B of FIG. 10, a pattern image 320-1 is a positive pattern image and has the pattern 171-1 described in the first embodiment and a positioning pattern 310-1. It is noted that a luminance value of the positioning pattern 310-1 changes in the positive direction, compared with peripheral parts other than the pattern. In addition, a pattern image 320-2 is a negative pattern image and has the pattern 171-2 described in the first embodiment and a positioning pattern 310-2. It is noted that a luminance value of the positioning pattern 310-2 changes in the positive direction, compared with peripheral parts other than the pattern.

In the following description, the positioning patterns 310-1 and 310-2 will be referred to as "positioning patterns 310" in a case of no need to describe the positioning patterns 310-1 and 310-2 in a discriminating manner. In the following description, the pattern images 320-1 and 320-2 will be referred to as "pattern images 320" in a case of no need to describe the pattern images 320-1 and 320-2 in a discriminating manner.

Figure 11:
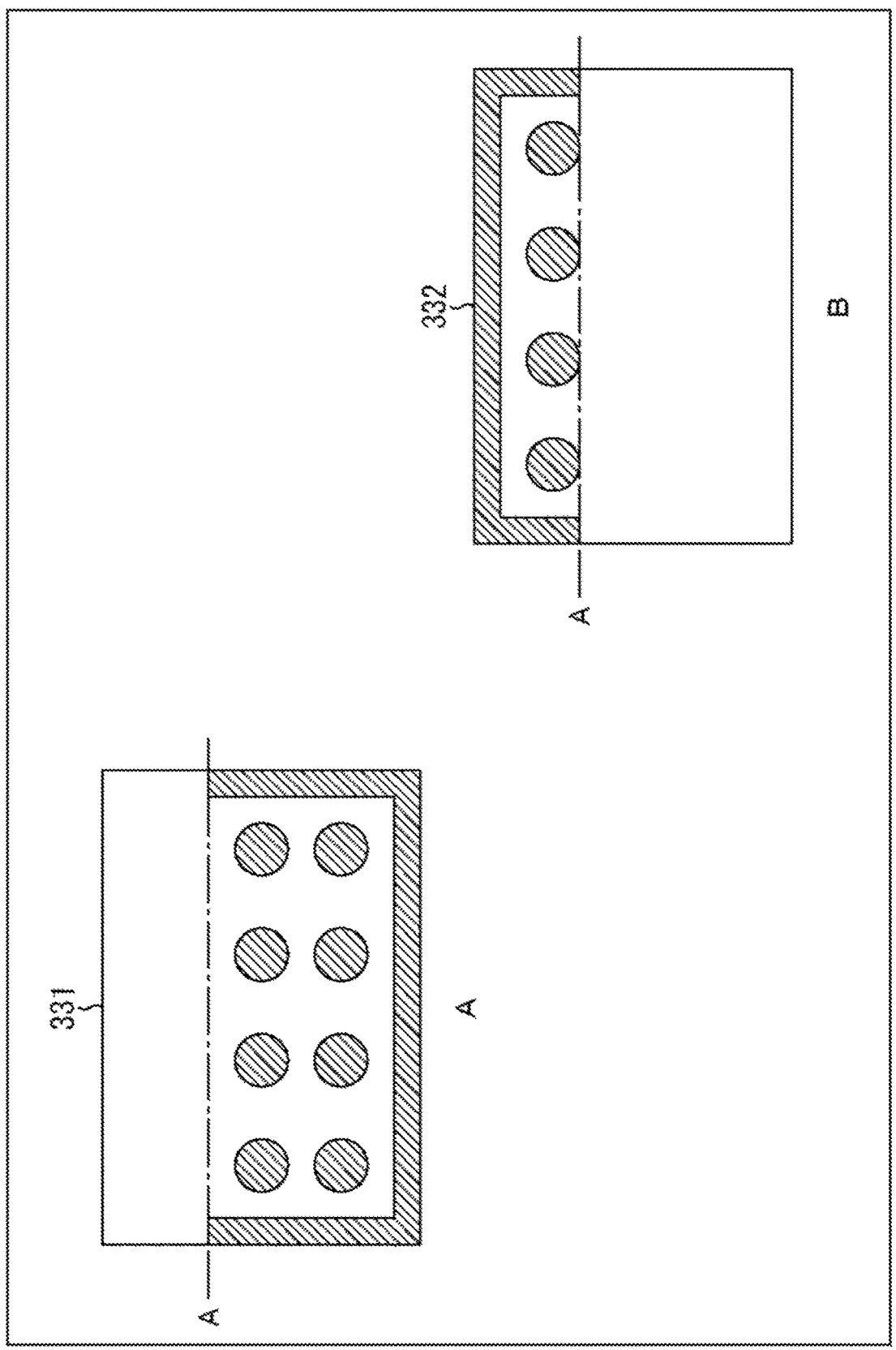
FIG. 11 is an illustrative diagram of an example of a manner of extracting regions of difference images.

In a case of performing the process described in the first embodiment using such pattern images 320, the difference calculation section 144 calculates the difference between the frames D and F and generates a difference image 331 in A of FIG. 11. In addition, the difference calculation section 144 calculates the difference between the frames E and G and generates a difference image 332 in B of FIG. 11.

As depicted in A of FIG. 11, in the difference image 331, the positioning pattern 310 is broken off in the pixel row (for example, the pixel row A) that serves as the boundary between the region where the plurality of frames of the projected image are mixed and the pattern detectable region. In other words, it is possible to identify the pixel row that serves as this boundary on the basis of this positioning pattern 310 more easily and more accurately. Likewise, in a case of the difference image 332, since the positioning pattern 310 is broken off in the pixel row (for example, the pixel row A) that serves as the boundary between the region where a plurality of frames of the projected image are mixed and the patter detectable region, it is possible to identify the pixel row that serves as this boundary more easily and more accurately.

In other words, by causing the cutting section 145 to cut the region in accordance with the pixel row in which this positioning pattern 310 is broken off, the projection imaging system 100 can cut and extract the pattern detectable region more accurately. In this case, since there is no need to synchronize projection with imaging as described in the second embodiment, cutting and extraction can be realized more easily, and the present technique can be applied to varied systems. Also in this case, the projection imaging system 100 can realize grasping of the state of the projected image at a lower cost.

<Flow of Projection Control Process>

Figure 12:
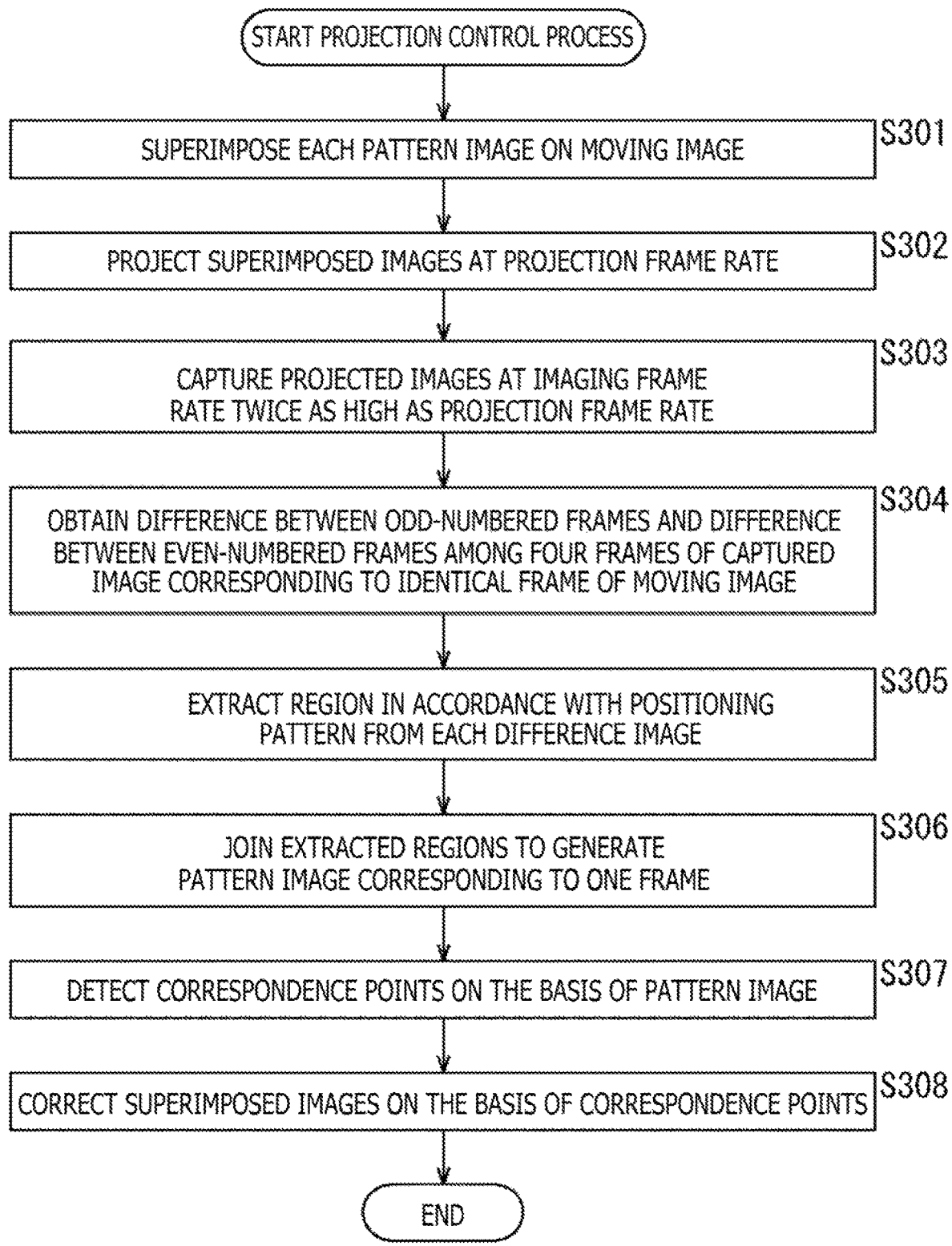
FIG. 12 is a flowchart illustrating an example of a flow of a projection control process.

An example of a flow of a projection control process in this case will be described with reference to the flowchart of FIG. 12.

When the projection control process is started, the pattern combining section 141 in the controller 101 superimposes the positive pattern image and the negative pattern image on the frame image of the content (moving image) to be projected in Step S301. It is noted that each of these pattern images includes both a pattern (for example, pattern 171) available for detecting each correspondence point between the projection apparatus 102 and the imaging apparatus 103 and a pattern (for example, positioning pattern 310) available for identifying the pixel row of the projected image.

Processes from Steps S302 to S304 are similarly executed to those (FIG. 7) from Steps S102 to S104 described in the first embodiment.

In Step S305, the cutting section 145 extracts a region in accordance with the positioning pattern 310 from each difference image obtained by the process of Step S304.

Processes from Steps S306 to S308 are similarly executed to those from Steps S106 to S108.

When the process of Step S308 is ended, the projection control process is ended. In this way, by executing the projection control process, the projection imaging system 100 can cut and extract the pattern detectable regions more easily and more accurately. Also in this case, the projection imaging system 100 can realize grasping of the state of the projected image at a lower cost.

<Configuration of Positioning Pattern>

It is noted that the positioning pattern 310 depicted in A of FIG. 10 includes not only a positioning pattern available for identifying the pixel row of the projected image but also a positioning pattern available for identifying a pixel column of the projected image.

For example, in the positioning pattern 310, a longitudinal pattern formed near each of the left and the right ends of the projected image is a positioning pattern available for identifying the pixel row of the projected image, and a lateral pattern formed near each of the upper and the lower ends of the projected image is a positioning pattern available for identifying the pixel column of the projected image.

In this way, including the positioning pattern available for identifying the pixel columns of the projected image in the pattern image makes it possible to use this positioning pattern for geometric correction of the projected image and the like.

It is noted that the positioning pattern 310 may be configured only with the positioning pattern available for identifying the pixel row of the projected image or may be configured only with the positioning pattern available for identifying the pixel column of the projected image.

In addition, a design, a marking, a shape, a position, and the like of the positioning pattern 310 are arbitrary and not limited to an example of FIG. 10. For example, the positioning pattern available for identifying the pixel row of the projected image may be formed only near the left end or near the right end of the projected image or may be formed in portions other than the ends. In addition, for example, the positioning pattern available for identifying the pixel column of the projected image may be formed only near the upper end or near the lower end of the projected image or may be formed in portions other than the ends.

For example, the positioning pattern 310 may be a grid form formed in the entire projected image.

Furthermore, for example, the pattern image may include patterns available for both detecting the correspondence points between the projection apparatus 102 and the imaging apparatus 103 and identifying the pixel row of the projected image. In a case of FIG. 10, for example, the pattern image 320 may include patterns that function as both the patterns 171 and the positioning pattern 310.

4. Fourth Embodiment

<Fast Imaging>

While it has been described so far that the frame rate of the captured image is twice as high as the frame rate of the projected image, the present disclosure is not limited to the case, and the frame rate of the captured image may be set arbitrarily as long as the frame rate of the captured image is higher than that of the projected image. The difference calculation section 144 calculates a difference between discontinuous frames of a captured image configured with a plurality of frames and obtained by capturing the projected image obtained by sequentially projecting predetermined pattern images opposite in sign, which are positive and negative pattern images by the projection section at the higher frame rate than the frame rate of the projected image by the imaging section driven by the rolling shutter scheme. It is thereby possible to realize online sensing based on the ISL scheme using the camera driven by the rolling shutter scheme. In other words, it is possible to realize grasping of the state of the projected image at a lower cost.

For example, the difference calculation section 144 may calculate a difference between the frames at intervals in accordance with a ratio of the frame rate of the projected image to that of the captured image. For example, the frame rate of the captured image may be 2N (where N is a natural number) times as high as the frame rate of the projected image. In that case, the difference calculation section 144 may calculate the difference between the frames at an interval of 2N frames.

Figure 13:
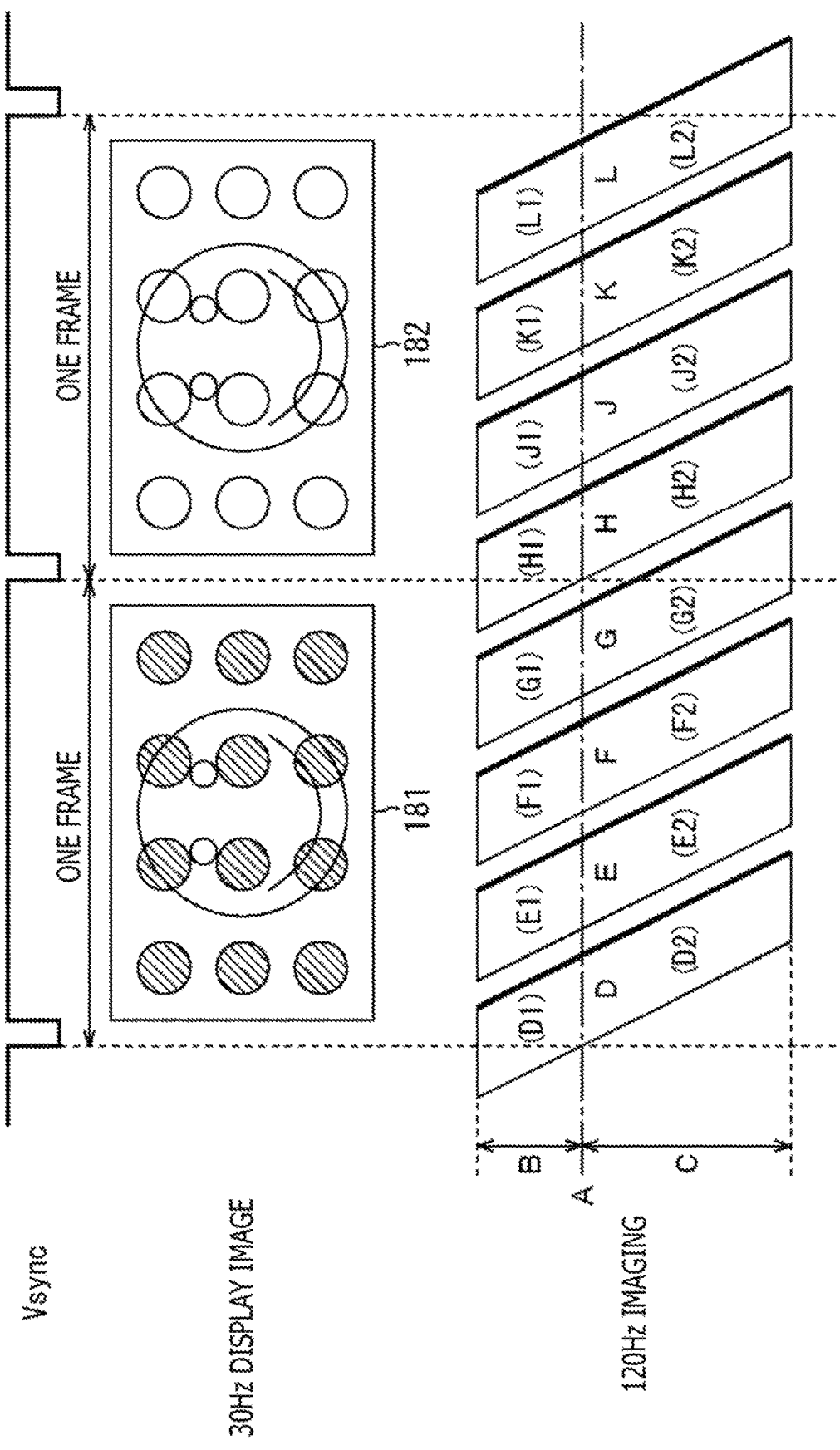
FIG. 13 is a timing chart illustrating an example of a relationship between projection and imaging.

For example, an example of a timing chart in a case of setting the frame rate of the captured image four times as high as the frame rate of the projected image is depicted in FIG. 13. As depicted in a lower stage of FIG. 13, making higher the frame rate of the captured image causes shortening of exposure time of each frame to increase the number of obtained frames; thus, it is unnecessary to use all the frames for detecting the pattern images.

<Image Selection>

Thus, the controller 101 may select frames each used for detecting the pattern images from among the frames of the captured image. At that time, the controller 101 may select frames where a plurality of frames of the projected image are mixed, such as frames D, G, H, and L of FIG. 13.

<Functional Blocks of Controller>

Figure 14:
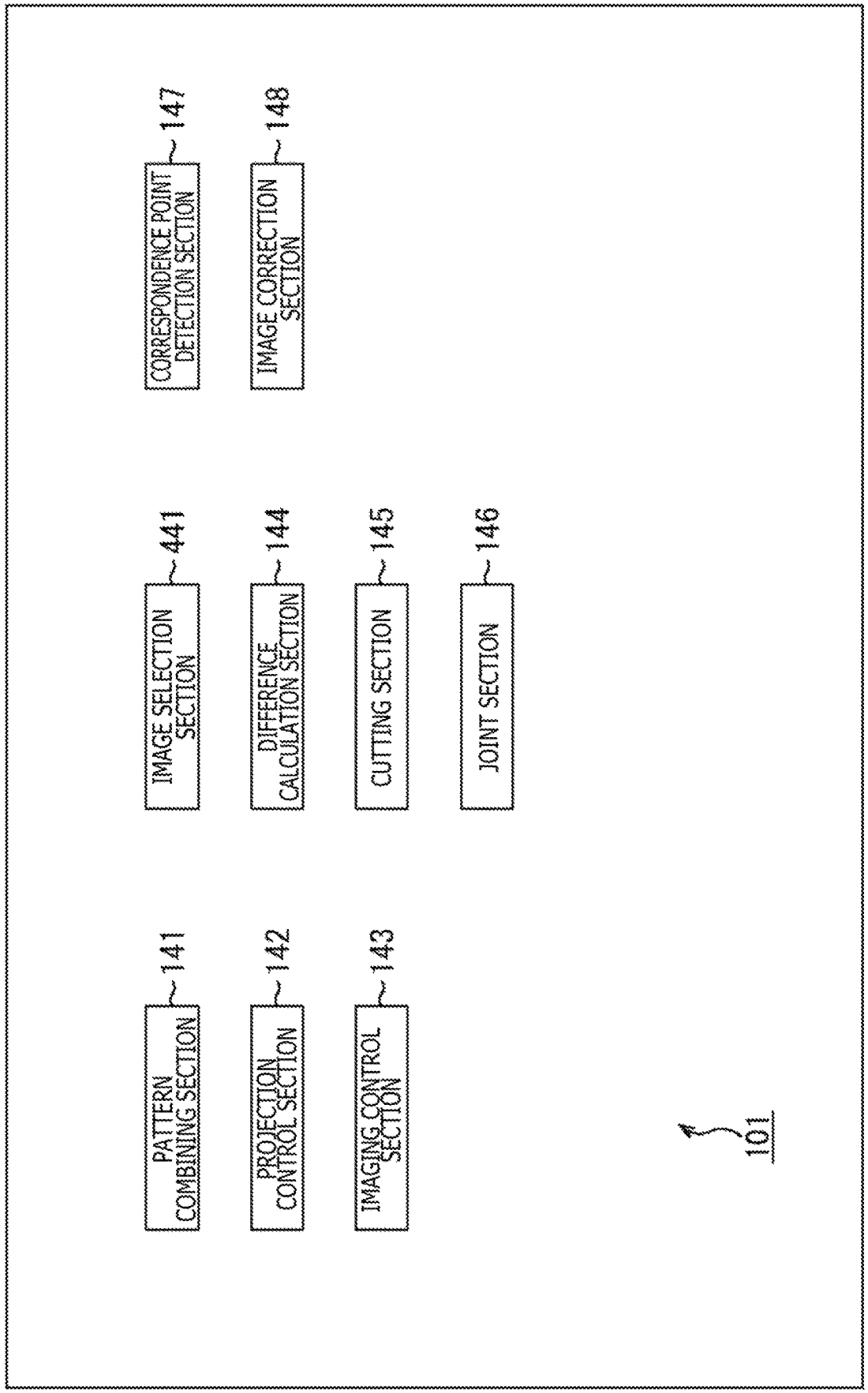
FIG. 14 is a functional block diagram illustrating an example of functions realized by the controller.

FIG. 14 is a functional block diagram illustrating an example of functions realized by the controller 101 in this case. As depicted in FIG. 14, in this case, the controller 101 has a function of, for example, an image selection section 441 in addition to the functions (FIG. 3) described in the first embodiment.

The image selection section 441 selects frames used for detecting the pattern images from among those of the captured image. At that time, the image selection section 441 selects frames (for example, frames D, G, H, and L) where a plurality of frames of the projected image are mixed.

When the image processing section 441 selects the frames, the difference calculation section 144 to the joint section 146 perform similar processes to those described in the first embodiment using the selected frames to detect a pattern image corresponding to one frame.

In this manner, similarly to the case of the first embodiment, the projection imaging system 100 can realize grasping of the state of the projected image at a lower cost.

<Flow of Projection Control Process>

An example of a flow of a projection control process in this case will be described with reference to the flowchart of FIG. 15.

When the projection control process is started, processes of Steps S401 and S402 are similarly executed to those (FIG. 7) of Steps S101 and S102.

In Step S403, the imaging control section 143 controls the imaging apparatus 103 driven by the rolling shutter scheme to capture the projected image projected onto the screen 10 by the process of Step S402 at an imaging frame rate higher than the projection frame rate.

In Step S404, the image selection section 441 selects a pair of frames of the captured image in each of which the positive pattern image and the negative pattern image are mixed in partial regions identical to each other and the positive or negative pattern image is contained in the other region among a frame group corresponding to frames identical to each other in the moving image.

In Step S405, the difference calculation section 144 obtains a difference between the pair of frames selected by the process of Step S404.

Figure 7:
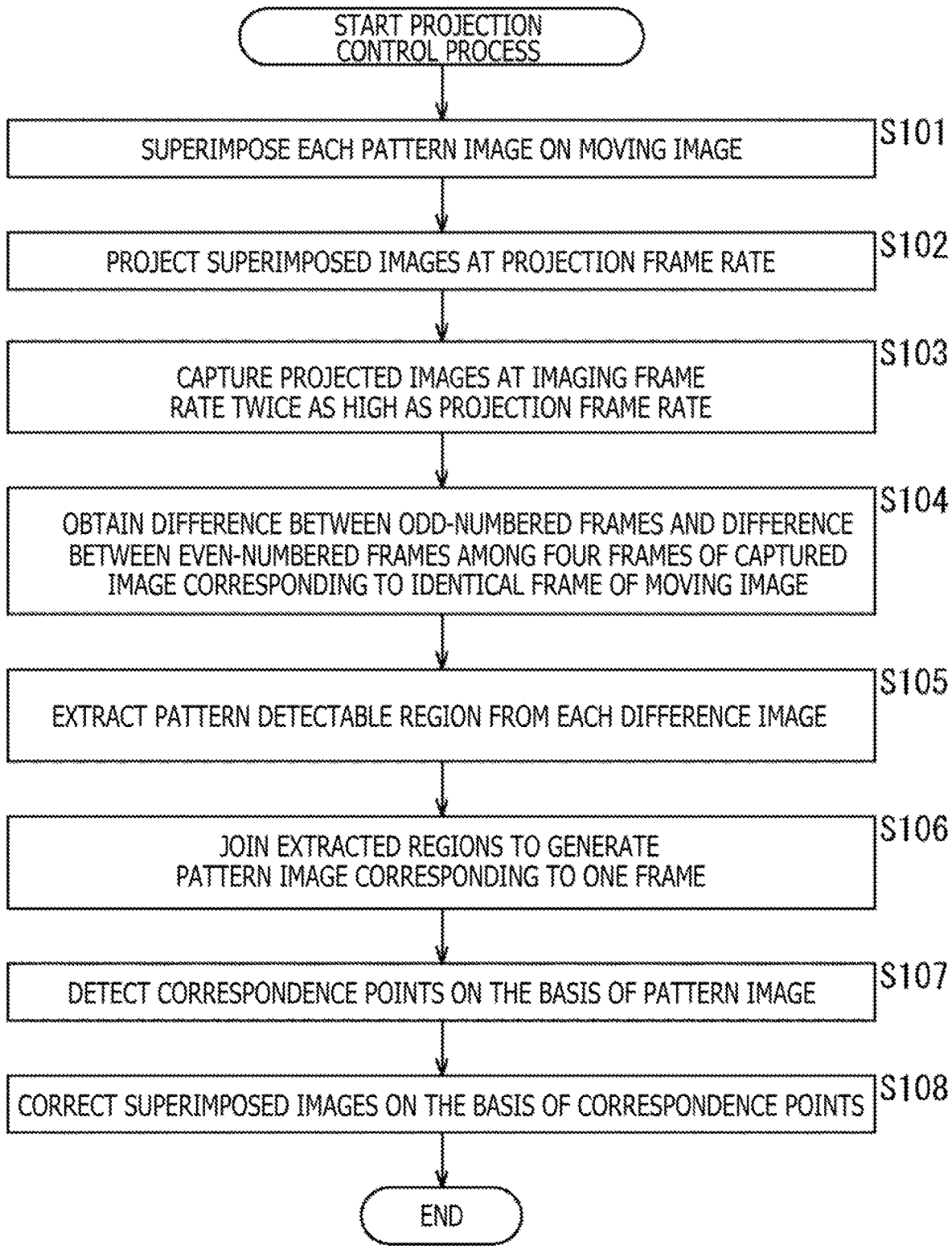
FIG. 7 is a flowchart illustrating an example of a flow of a projection control process.

Processes from Steps S406 to S409 are similarly executed to those from Steps S105 to S108 (FIG. 7).

When the process of Step S409 is ended, the projection control process is ended. In this way, by executing the projection control process, the projection imaging system 100 can realize grasping of the state of the projected image at a lower cost also in this case.

<Image Selection>

At a time of selecting frames used for detecting the pattern images from among the frames of the captured image, the controller 101 may select frames where a plurality of frames of the projected image are not mixed (that is, frames each including only a single frame of the projected image), such as a frame E or F and a frame J or K of FIG. 13.

<Functional Blocks of Controller>

Figure 16:
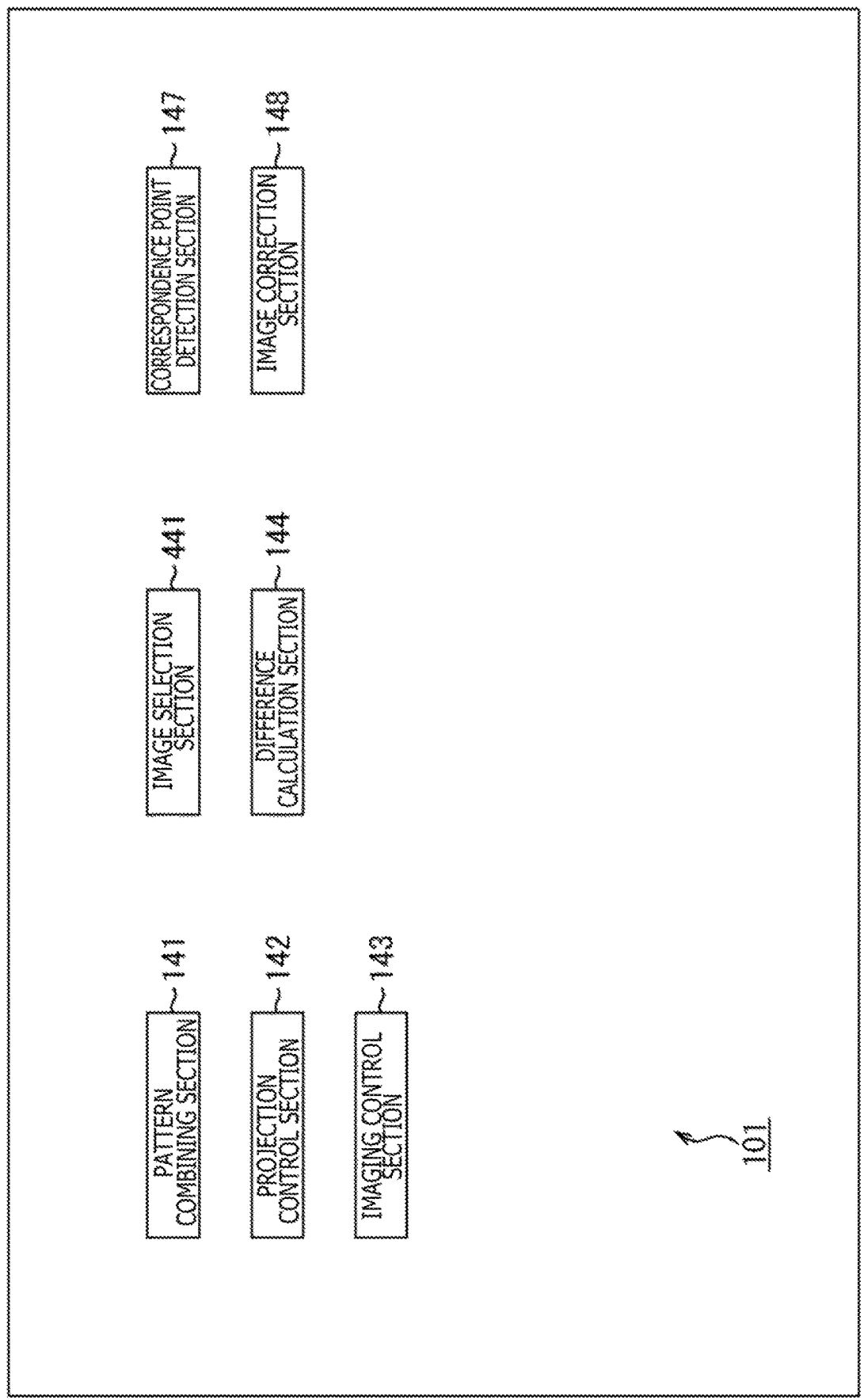
FIG. 16 is a functional block diagram illustrating an example of functions realized by the controller.

FIG. 16 is a functional block diagram illustrating an example of functions realized by the controller 101 in this case. As depicted in FIG. 16, in this case, the controller 101 has the function of the image selection section 441 similarly to the case described with reference to FIG. 14. In addition, the cutting section 145 and the joint section 146 can be omitted.

The image selection section 441 selects frames used for detecting the pattern images from among those of the captured image. At that time, the image selection section 441 selects frames (for example, frame E or F and frame J or K) each containing only the single frame of the projected image.

When the image generation section 441 selects the frames, the difference calculation section 144 generates a difference image between the selected frames. In this case, since a plurality of frames of the projected image are not mixed in each selected frame, it is possible to detect a pattern image corresponding to one frame by causing the difference calculation section 144 to generate a difference image. In this case, therefore, it is possible to omit the cutting section 145 and the joint section 146.

In this manner, similarly to the case of the first embodiment, the projection imaging system 100 can realize grasping of the state of the projected image at a lower cost.

<Flow of Projection Control Process>

Figure 17:
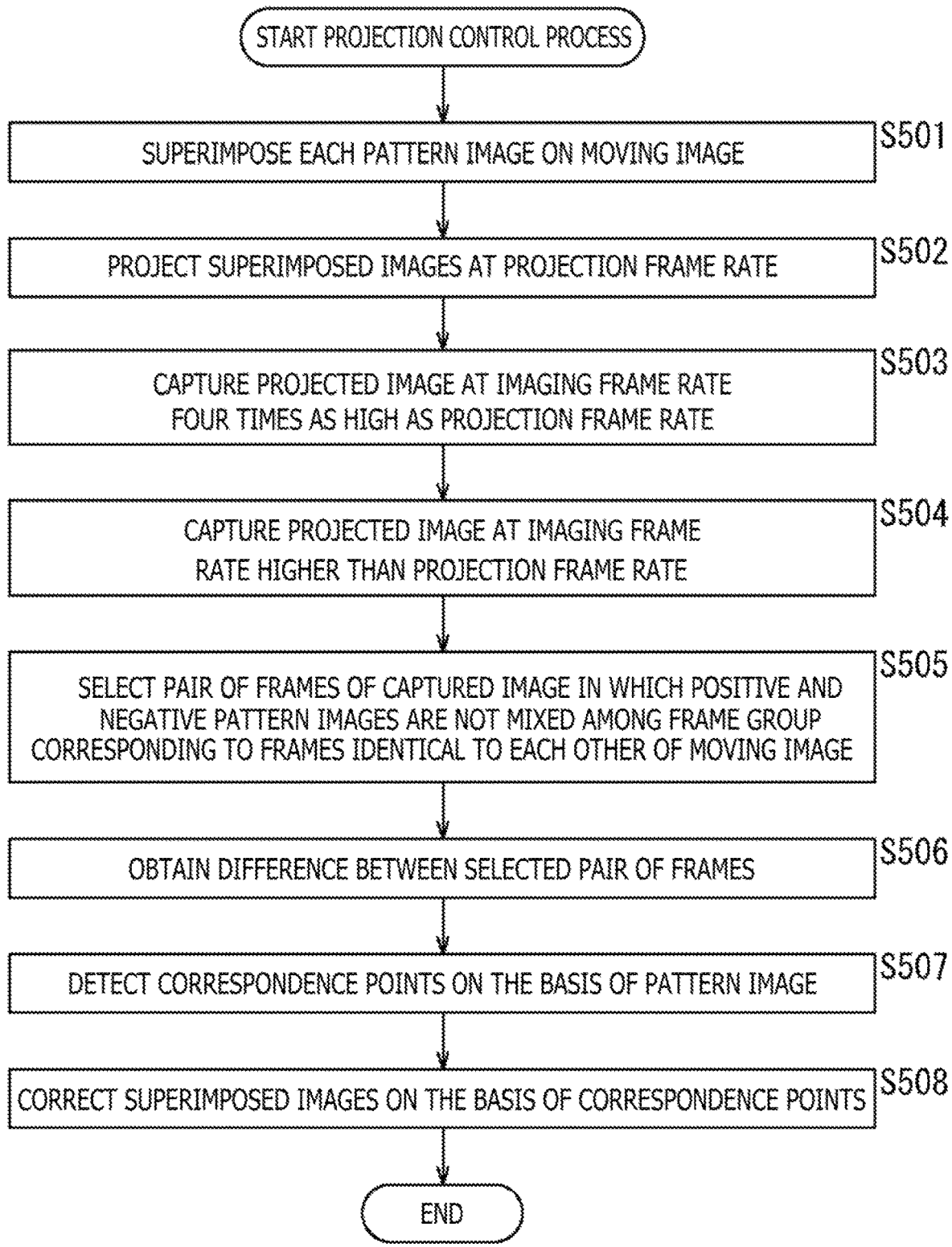
FIG. 17 is a flowchart illustrating an example of a flow of a projection control process.

An example of a flow of a projection control process in this case will be described with reference to the flowchart of FIG. 17.

When the projection control process is started, processes from Steps S501 to S503 are similarly executed to those (FIG. 15) from Steps S401 to S403.

In Step S504, the image selection section 441 selects a pair of frames of a captured image in which the positive pattern image and the negative pattern image are not mixed among a frame group corresponding to frames identical to each other in the moving image.

In Step S505, the difference calculation section 144 obtains a difference between the pair of frames selected by the process of Step S504.

Figure 15:
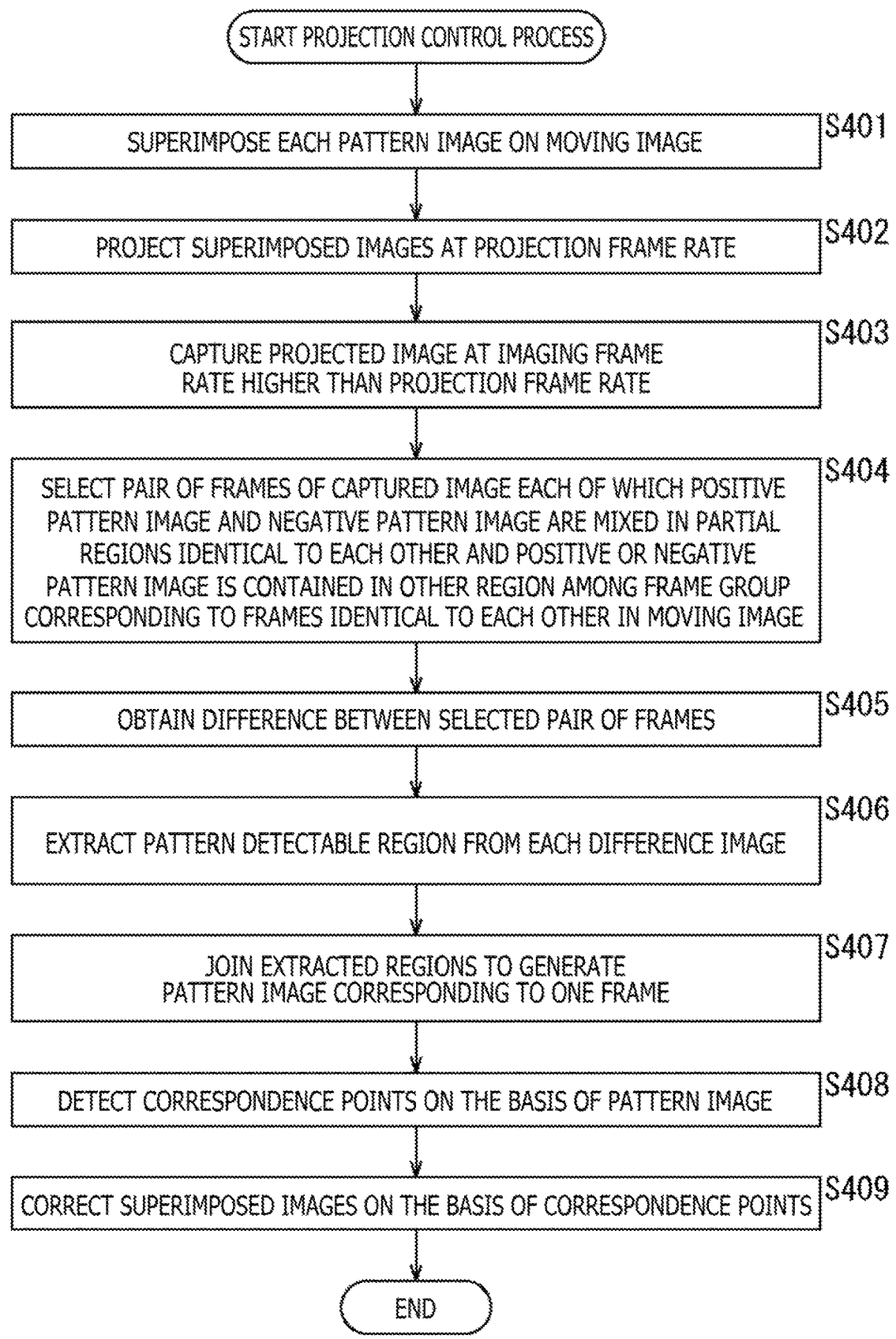
FIG. 15 is a flowchart illustrating an example of a flow of a projection control process.

Processes of Steps S506 and 3507 are similarly executed to those from of Steps S408 and S409 (FIG. 15).

When the process of Step S507 is ended, the projection control process is ended. In this way, by executing the projection control process, the projection imaging system 100 can realize grasping of the state of the projected image at a lower cost also in this case.

5. Fifth Embodiment

<Other Examples of Configuration>

It is noted that the configuration of the projection imaging system 100 to which the present technique is applied is arbitrary and not limited to the examples described above. For example, as depicted in A of FIG. 18, the controller 101 may be integrated with the imaging apparatus 103. In a case of an example of A of FIG. 18, the projection imaging system 100 is configured with the projection apparatus 102 and an imaging apparatus 603. The projection apparatus 102 and the imaging apparatus 603 are communicably connected to each other in an arbitrary configuration. In addition, the imaging apparatus 603 incorporates a control section 601 having a function similar to that of the controller 101 described above, and has functions of the controller 101 and the imaging apparatus 103 described above. Also in this case, therefore, it is possible to realize grasping of the state of the projected image at a lower cost.

Alternatively, as depicted in, for example, B of FIG. 18, the controller 101 may be integrated with the projection apparatus 102. In a case of an example of B of FIG. 18, the projection imaging system 100 is configured with a projection apparatus 612 and the imaging apparatus 103. The projection apparatus 612 and the imaging apparatus 103 are communicably connected to each other in an arbitrary configuration. In addition, the projection apparatus 612 incorporates a control section 611 having a function similar to that of the controller 101 described above, and has functions of the controller 101 and the projection apparatus 102 described above. Also in this case, therefore, it is possible to realize grasping of the state of the projected image at a lower cost.

It is noted that the projection imaging system 100 may be realized as an apparatus as depicted in C of FIG. 18. In a case of C of FIG. 18, a projection imaging apparatus 620 has functions similar to those of the projection imaging system 100. In other words, the projection imaging apparatus 620 has a control section 621, a projection section 622, and an imaging section 623. The control section 621 has a function similar to that of the controller 101 described above, the projection section 622 has a function similar to that of the projection apparatus 102 described above, and the imaging section 623 has a function similar to that of the imaging apparatus 103 described above. Also in this case, therefore, it is possible to realize grasping of the state of the projected image at a lower cost.

Although not depicted, the projection apparatus 102 may be integrated with the imaging apparatus 103. In other words, the projection imaging system 100 may be configured with a projection imaging apparatus that has functions of both the projection apparatus 102 and the imaging apparatus 103.

While it has been described above that the number of each of the various kinds of apparatuses such as controllers, projection apparatuses, and projection imaging apparatuses is one, the numbers of these various apparatuses are arbitrary. For example, the projection imaging system 100 may have a plurality of each of these various apparatuses. In addition, the numbers of the apparatuses are not necessarily uniform. Furthermore, the projection imaging system 100 may have an apparatus other than these apparatuses.

6. Others

<Application Example of Present Technique>

The system or the apparatus according to the embodiments described above can be applied to an arbitrary system or an arbitrary electronic apparatus. In addition, the present technique is applicable to an image processing system or an image processing apparatus in an arbitrary field, for example, a field of transportation, medicine, crime prevention, agriculture, stockbreeding, mining, beauty, factories, consumer electronics, weather, or nature monitoring.

For example, the present technique can be applied also to a system that projects and captures an image used for appreciation. Alternatively, the present technique can be applied also to, for example, a system used for transportation. As another alternative, the present technique can be applied also to, for example, a system used for security. As yet another alternative, the present technique can be applied also to, for example, a system used for sports. As still another alternative, the present technique can be applied also to, for example, a system used for agriculture. As yet another alternative, the present technique can be applied to, for example, a system used for stockbreeding. Furthermore, the present technique can be applied also to a system that monitors a state of nature, for example, a volcano, a forest, or an ocean, to a meteorological observation system that observes, for example, the weather, temperature, humidity, wind speed, and/or hours of sunshine, or to a system that observes ecology of wildlife, for example, birds, fishes, reptiles, amphibians, mammals, insects, and/or plants, and the like.

<Software>

A series of processes described above can be also executed by hardware or by software. In a case of executing the series of processes described above by software, a program configuring the software is installed from a network or a recording medium.

In a case of, for example, the controller 101 of FIG. 2, this recording medium is configured by the removable medium 131 distributed to deliver a program to a user and recording the program separately from a controller main body. In that case, by attaching the removable medium 131 to, for example, the drive 125, this program stored in the removable medium 131 can be read out and installed in the storage section 123.

Furthermore, this program can be also provided via a wired or wireless transmission medium such as a local area network, the Internet, or a digital satellite broadcasting. In the case of the controller 101 of FIG. 2, for example, the program can be received by the communication section 124 and installed in the storage section 123.

Furthermore, this program can be also installed in a storage section, a ROM, or the like in advance. In the case of the controller 101 of FIG. 2, for example, the program can be also installed in the storage section 123, the ROM 112, or the like in advance.

It is noted that the program executed by a computer may be configured such that processes of steps describing the program are executed in time series in an order described in the present specification, or such that the processes are executed individually in parallel or at necessary timing such as timing of calling. Furthermore, the processes of the steps describing this program may be executed in parallel to processes of the other program or may be executed in combination with the processes of the other program.

Moreover, the processes of the steps described above may be executed by each apparatus described above or an arbitrary apparatus other than the apparatuses described above. In that case, the apparatus executing the processes may have functions (such as functional blocks) necessary to execute the processes. In addition, information necessary for the process may be transmitted to the apparatus as appropriate.

Others

The embodiments of the present technique are not limited to the embodiments described above, and various changes can be made in a range of not departing from the spirit of the present technique.

Furthermore, the present technique is not only carried out as the apparatus or the system but also as any configuration mounted on the apparatus or the apparatus configuring the system, for example, a processor serving as a system LSI (Large Scale Integration), a module using a plurality of processors or the like, a unit using a plurality of modules or the like, a set to which other functions are further added to the unit (that is, a configuration of part of the apparatus).

It is noted that the system means in the present specification a collection of a plurality of constituent elements (apparatuses, modules (components), or the like), regardless of whether or not all the constituent elements are provided in a same casing. Therefore, a plurality of apparatuses accommodated in different casings and connected to one another via a network, and one apparatus in which a plurality of modules are accommodated in one casing can be each referred to as a "system."

Furthermore, the configuration described as one apparatus (or one processing section), for example, may be divided and configured as a plurality of apparatuses (or processing sections). Conversely, the configurations described above as a plurality of apparatuses (or processing sections) may be integrated and configured as one apparatus (or one processing section). Moreover, needless to say, a configuration other than that of each apparatus (or each processing section) described above may be added to the configuration of each apparatus (or each processing section). Furthermore, if the configurations or operations are substantially identical as an entire system, part of the configuration of a certain apparatus (or certain processing section) may be included in the configuration of the other apparatus (or other processing section).

For example, the present technique can have a cloud computing configuration for causing a plurality of apparatuses to process one function via a network in a sharing or cooperative fashion.

Furthermore, the program described above can be executed by, for example, an arbitrary apparatus. In that case, the apparatus may be configured to have necessary functions (functional blocks or the like) so as to be able to obtain necessary information.

Furthermore, each step described in the above flowcharts can be not only executed by one apparatus but also executed by a plurality of apparatuses in a sharing fashion. Moreover, in a case in which one step includes a plurality of processes, the plurality of processes included in the one step can be not only executed by one apparatus but also executed by a plurality of apparatuses in a sharing fashion. In other words, the plurality of processes included in the one step can be executed as processes of a plurality of steps. Conversely, the processes described as a plurality of steps may be integrated into one step and executed collectively.

A plurality of present techniques described in the present specification can be carried out independently and solely only if there is no inconsistency. Needless to say, a plurality of arbitrary present techniques can be used together and carried out. For example, part or all of the present technique described in any of the embodiments may be used in combination with part or all of the present technique described in another embodiment to be carried out. Furthermore, part or all of arbitrary present techniques described above can be used together with other techniques that are not described above to be carried out.

It is noted that the present technique can be also configured as follows.

(1) An image processing apparatus including
a difference calculation section calculating a difference between discontinuous frames of a captured image configured with a plurality of frames obtained by capturing a projected image which is obtained by sequentially projecting predetermined pattern images opposite in sign, which are positive and negative pattern images, by a projection section at a higher frame rate than a frame rate of the projected image by an imaging section driven by a rolling shutter scheme.

(2) The image processing apparatus according to (1), in which
the difference calculation section is configured to calculate a difference between the frames at an interval in accordance with a ratio of the frame rate of the projected image to the frame rate of the captured image.

(3) The image processing apparatus according to (1) or (2), in which
the frame rate of the captured image is twice as high as the frame rate of the projected image, and the difference calculation section calculates difference between the frames at an interval of two frames.

(4) The image processing apparatus according to any of (1) to (3), further including:
an extraction section extracting a region where the pattern images are detectable from the difference between the frames calculated by the difference calculation section; and
a joint section joining the region extracted from each of a plurality of differences by the extraction section together to generate the pattern image corresponding to one frame.

(5) The image processing apparatus according to any of (1) to (4), further including a correspondence point detection section detecting correspondence points between the projection section and the imaging section using the pattern image generated by the joint section.

(6) The image processing apparatus according to any of (1) to (5), further including
an image correction section correcting an image projected by the projection section using the correspondence points detected by the correspondence point detection section.

(7) The image processing apparatus according to any of (1) to (6), in which
the pattern images each include patterns available for detecting correspondence points between the projection section and the imaging section and patterns available for identifying a pixel row of the projected image, and
the extraction section is configured to extract the regions where the pattern images are detectable on the basis of the patterns available for identifying the pixel row of the projected image.

(8) The image processing apparatus according to any of (1) to (7), in which
the pattern images each further include patterns available for identifying a pixel column of the projected image.

(9) The image processing apparatus according to any of (1) to (8), in which
the patterns available for identifying the pixel row of the projected image and the patterns available for identifying the pixel column of the projected image in each of the pattern images are formed near left, right, upper, and lower ends of the projected image.

(10) The image processing apparatus according to any of (1) to (9), in which
the patterns available for identifying the pixel row of the projected image and the patterns available for identifying the pixel column of the projected image in the pattern image are formed in a grid form on entirety of the projected image.

(11) The image processing apparatus according to any of (1) to (10), in which
the pattern images each include patterns available for both detecting correspondence points between the projection section and the imaging section and identifying a pixel row of the projected image, and
the extraction section is configured to extract the regions where the pattern images are detectable on the basis of the patterns available for both detecting the correspondence points between the projection section and the imaging section and identifying the pixel row of the projected image.

(12) The image processing apparatus according to any of (1) to (11), further including
a synchronous processing section synchronizing timing of projection by the projection section with timing of imaging by the imaging section.

(13) The image processing apparatus according to any of (1) to (12), in which
the frame rate of the captured image is 2N (where N is a natural number) times as high as the frame rate of the projected image, and
the difference calculation section is configured to calculate a difference between the frames at an interval of 2N frames.

(14) The image processing apparatus according to any of (1) to (13), further including
an image selection section selecting frames for which the difference calculation section calculates the difference from the captured image of the plurality of frames.

(15) The image processing apparatus according to any of (1) to (14), in which the image selection section selects frames in each of which a plurality of frames of the projected image are mixed, in the captured image.

(16) The image processing apparatus according to any of (1) to (15), in which the image selection section selects frames in each of which only a single frame of the projected image is included, in the captured image.

(17) The image processing apparatus according to any of (1) to (16), in which the projected image is obtained by sequentially projecting a superimposed image on which the pattern image that is positive is superimposed, and a superimposed image on which the pattern image that is negative is superimposed, onto predetermined frames of a moving image.

(18) The image processing apparatus according to any of (1) to (17), further including the imaging section.

(19) The image processing apparatus according to any of (1) to (18), further including the projection section.

(20) An image processing method including calculating a difference between discontinuous frames of a captured image configured with a plurality of frames obtained by capturing a projected image which is obtained by sequentially projecting predetermined pattern images opposite in sign, which are positive and negative pattern images, at a higher frame rate than a frame rate of the projected image by a rolling shutter scheme.

REFERENCE SIGNS LIST

100: Projection imaging system
101: Controller
102: Projection apparatus
103: Imaging apparatus
111: CPU
112: ROM
113: RAM
114: bus
120: Input/output interface
121: Input section
122: Output section
123: Storage section
124: Communication section
125: Drive
131: Removable medium
141: Pattern combining section
142: Projection control section
143: Imaging control section
144: Difference calculation section
145: Cutting section
146: Joint section
147: Correspondence point detection section
148: Image correction section
241: Synchronous processing section
441: Image selection section
601: Control section
603: Imaging apparatus
611: Control section
612: Projection apparatus
620: Projection imaging apparatus
621: Control section
622: Projection section
623: Imaging section

The invention claimed is:

1. An image processing apparatus comprising:
a projector;
a camera; and
circuitry configured to calculate a difference between discontinuous frames of a captured image configured with a plurality of frames obtained by capturing a projected image that is projected by the projector, the projected image having sequentially projected predetermined pattern images opposite in sign superimposed thereon, the predetermined pattern images including positive pattern images and negative pattern images, and the captured image being captured at a higher frame rate than a frame rate of the projected image by the camera, which is configured to be driven by a rolling shutter scheme,
wherein the sequentially projected predetermined pattern images include the positive pattern images superimposed in different regions in continuous frames of the captured image followed by the negative pattern images superimposed in the different regions in continuous frames of the captured image.

2. The image processing apparatus according to claim 1, wherein
the circuitry calculates the difference between the discontinuous frames at an interval in accordance with a ratio of the frame rate of the projected image to the frame rate of the captured image.

3. The image processing apparatus according to claim 2, wherein
the frame rate of the captured image is twice as high as the frame rate of the projected image, and
the circuitry calculates the difference between the discontinuous frames at an interval of two frames.

4. The image processing apparatus according to claim 3, wherein the circuitry is further configured to
extract a region where the pattern images are detectable from the calculated difference between the frames, and
join the region extracted from each of a plurality of differences together to generate the pattern image corresponding to one frame.

5. The image processing apparatus according to claim 4, wherein the circuitry is further configured to
detect correspondence points between the projector and the camera using the generated pattern image.

6. The image processing apparatus according to claim 5, wherein the circuitry is further configured to
correct a projected image by using the detected correspondence points.

7. The image processing apparatus according to claim 4, wherein
the pattern images each include patterns available for detecting correspondence points between the projector and the camera and patterns available for identifying a pixel row of the projected image, and
the circuitry extracts each region where the pattern images are detectable on the basis of the patterns available for identifying the pixel row of the projected image.

8. The image processing apparatus according to claim 7, wherein
the pattern images each further include patterns available for identifying a pixel column of the projected image.

9. The image processing apparatus according to claim 8, wherein
the patterns available for identifying the pixel row of the projected image and the patterns available for identifying the pixel column of the projected image in each of the pattern images are formed near left, right, upper, and lower ends of the projected image.

10. The image processing apparatus according to claim 8, wherein
the patterns available for identifying the pixel row of the projected image and the patterns available for identifying the pixel column of the projected image in the pattern image are formed in a grid form on entirety of the projected image.

11. The image processing apparatus according to claim 4, wherein
the pattern images each include patterns available for both detecting correspondence points between the projector and the camera and identifying a pixel row of the projected image, and
the circuitry extracts each region where the pattern images are detectable on the basis of the patterns available for both detecting the correspondence points between the projector and the camera and identifying the pixel row of the projected image.

12. The image processing apparatus according to claim 2, wherein the circuitry is further configured to
synchronize timing of projection by the projector with timing of imaging by the camera.

13. The image processing apparatus according to claim 2, wherein
the frame rate of the captured image is 2N (where N is a natural number) times as high as the frame rate of the projected image, and
the circuitry calculates the difference between the frames at an interval of 2N frames.

14. The image processing apparatus according to claim 13, wherein the circuitry is further configured to
select frames for which the circuitry calculates the difference from the captured image of the plurality of frames.

15. The image processing apparatus according to claim 14, wherein
the circuitry selects frames in each of which a plurality of frames of the projected image are mixed, in the captured image.

16. The image processing apparatus according to claim 14, wherein
the circuitry selects frames in each of which only a single frame of the projected image is included, in the captured image.

17. The image processing apparatus according to claim 2, wherein
the projected image is obtained by sequentially projecting a superimposed image on which the pattern image that is positive is superimposed, and a superimposed image on which the pattern image that is negative is superimposed, onto predetermined frames of a moving image.

18. The image processing apparatus according to claim 1, wherein the positive pattern images include a first positive pattern image superimposed in a first region of a first frame followed by a second positive pattern image superimposed in a second region of a second frame,
wherein the negative pattern images include a first negative pattern image superimposed in the first region of a third frame followed by a second negative pattern image superimposed in the second region of a fourth frame,
wherein the first frame and the second frame are continuous frames, and
wherein the third frame and the fourth frame are continuous frames.

19. An image processing method, comprising:
calculating a difference between discontinuous frames of a captured image configured with a plurality of frames obtained by capturing a projected image, the projected image having sequentially projected predetermined pattern images opposite in sign superimposed thereon, the predetermined pattern images including positive pattern images and negative pattern images and captured at a higher frame rate than a frame rate of the projected image by a rolling shutter scheme,
wherein the sequentially projected predetermined pattern images include the positive pattern images superimposed in different regions in continuous frames of the captured image followed by the negative pattern images superimposed in the different regions in continuous frames of the captured image.

* * * * *